United States Patent [19]
Sumino et al.

[11] Patent Number: 5,976,378
[45] Date of Patent: Nov. 2, 1999

[54] METHOD AND SYSTEM FOR REMOVING NITROGEN AND IMMOBILIZED MICROORGANISMS

[75] Inventors: Tatsuo Sumino; Nobuko Hashimoto; Kazuhiko Noto; Takako Ogasawara, all of Tokyo, Japan

[73] Assignee: Hitachi Plant Engineering & Construction Co., Ltd., Tokyo, Japan

[21] Appl. No.: 08/957,769

[22] Filed: Oct. 24, 1997

[30] Foreign Application Priority Data

| Nov. 1, 1996 | [JP] | Japan | 8-291843 |
| Nov. 22, 1996 | [JP] | Japan | 8-312268 |
| Dec. 17, 1996 | [JP] | Japan | 8-336786 |
| Oct. 16, 1997 | [JP] | Japan | 9-283872 |

[51] Int. Cl.$^6$ ..................... C02F 3/02
[52] U.S. Cl. ............. 210/616; 210/618; 210/620; 210/631; 210/757; 210/903
[58] Field of Search ............... 210/605, 616, 210/617, 618, 620, 630, 631, 757, 903

[56] References Cited

U.S. PATENT DOCUMENTS

| 3,617,579 | 11/1971 | Gunderloy, Jr. | 210/903 |
| 4,029,575 | 6/1977 | Bykowski et al. | 210/605 |
| 4,880,542 | 11/1989 | Sublette | 210/617 |
| 4,981,593 | 1/1991 | Priestley et al. | 210/618 |
| 4,990,266 | 2/1991 | Vorlop et al. | 210/757 |
| 5,061,368 | 10/1991 | Tada et al. . | |
| 5,447,633 | 9/1995 | Matsche et al. | 210/605 |
| 5,462,666 | 10/1995 | Kimmell | 210/617 |
| 5,486,292 | 1/1996 | Bair et al. | 210/616 |

OTHER PUBLICATIONS

*Nitrogen Removal Systems Using Immobilized Microorganism in Synthetic Resin*, Minuro Tada et al., vol. 39, No. 6, Dec., 1990, pp. 379–386.

*Primary Examiner*—Christopher Upton
*Attorney, Agent, or Firm*—Oliff & Berridge, PLC

[57] ABSTRACT

Waste water containing ammonium nitrogen is brought into contact with either one of a catalytically acting substance for converting an ammonium oxidizing product produced by being oxidized by oxidizing bacteria for oxidizing ammonium nitrogen or converting bacteria for reproducing converting capacity of the catalytically acting substance in the aerobic condition.

10 Claims, 20 Drawing Sheets

FIG. 1
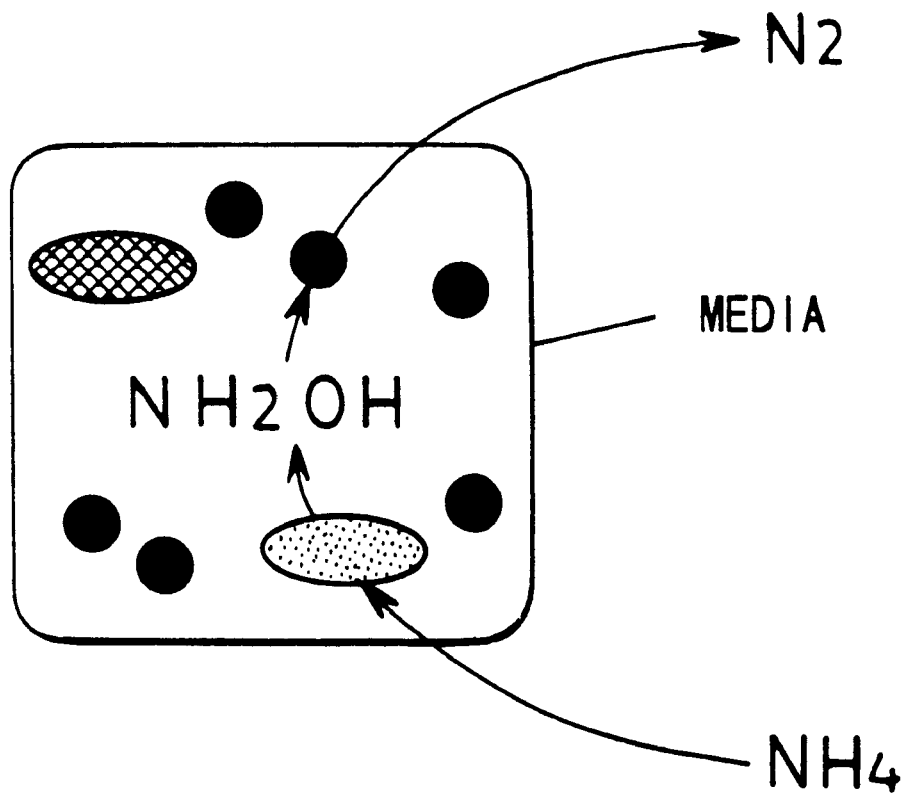
 BACTERIA FOR OXIDIZING AMMONIUM
 CATALYTICALLY ACTING SUBSTANCE
 BACTERIA FOR REPRODUCING CATALYST F I G. 3
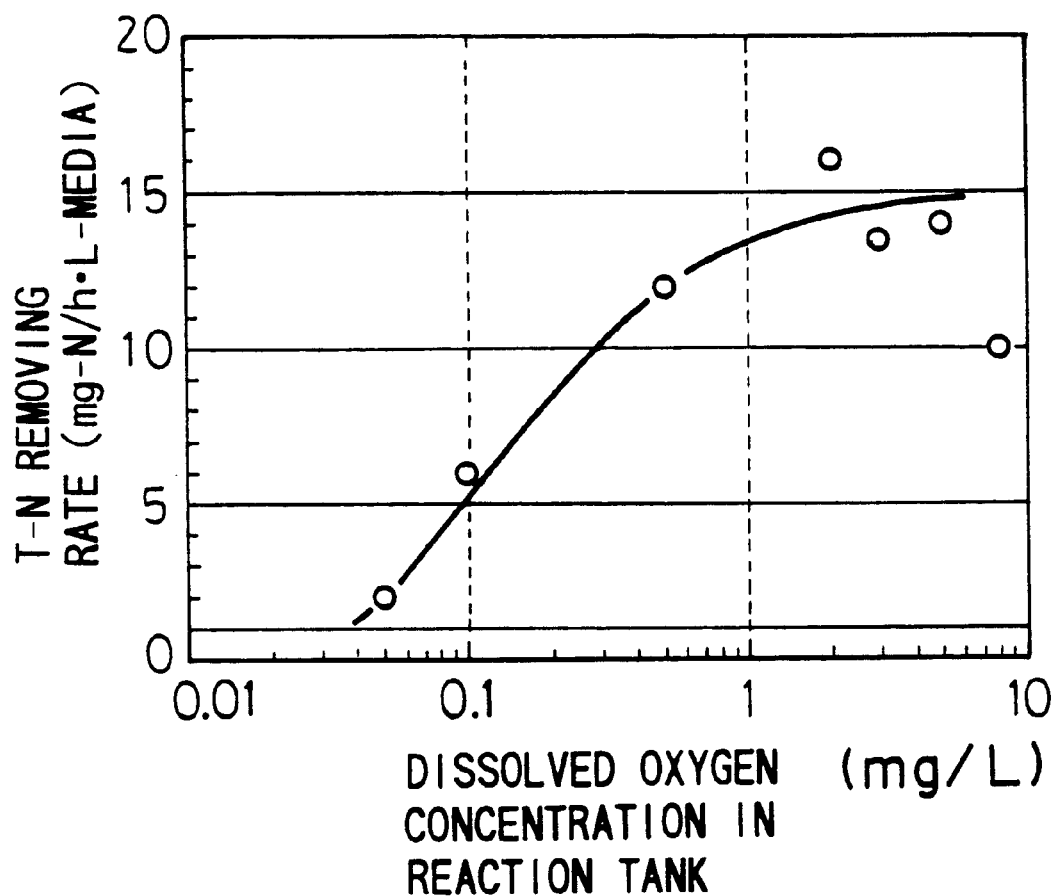

F I G. 9
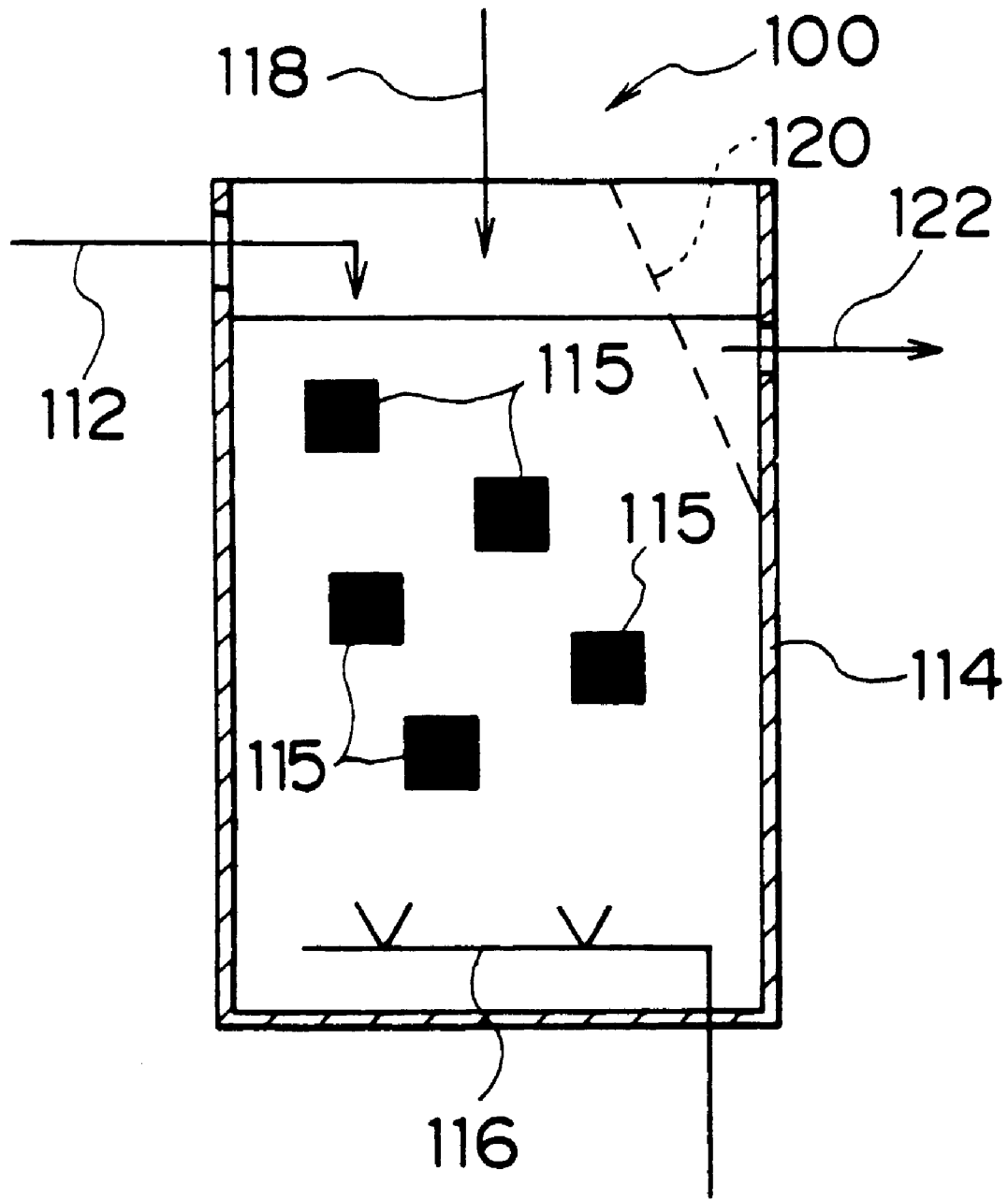

OXIDIZING OF AMMONIUM BY NITRIFYING BACTERIA

CHEMICAL OXIDIZING OF HYDROXYLAMINE

OXIDIZING OF IRON IONS BY IRON OXIDIZING BACTERIA

CONTINUOUS TREATING OPERATION BY USE OF MEDIA CONTAINING FLY ASH OF 15%

METHOD AND SYSTEM FOR REMOVING NITROGEN AND IMMOBILIZED MICROORGANISMS

BACKGROUND OF THE INVENTION

1. Field of the Invention

This invention relates to a method and a system for removing nitrogen and immobilized microorganisms, and more particularly to a method and a system for removing nitrogen and immobilized microorganisms, in which processing time is short and energy-saving type waste water process can be performed.

2. Description of Related Art

Nitrogen in the waste water such as drainage, excrement and industrial waste water is attributed to a cause of the eutrophication phenomenon in a closed water area such as a lake, an interior bay and the like.

A method of removing nitrogen for removing the nitrogen component from the waste water, a biological nitrogen removing process utilizing bacteria has been performed, and, as a typical example thereof, an activated sludge circulation modified method has been used. According to this biological nitrogen removing method, by utilizing oxidizing capacity of a nitrogen composed of nitrifying bacteria as being independent nutritional bacteria, firstly ammonium nitrogen in the waste water oxidized into nitrous acid and nitric acid in the aerobic condition thereafter, under the work of denitrifying bacteria as being subordinate nutritional bacteria, by utilizing the organic substance and the like in the waste water as an electron donor, nitrous acid and nitric acid are reduced to nitrogen in the anaerobic condition, whereby nitrogen is removed from the waste water.

Furthermore, as for the removal of nitrogen, it is required that the total value of nitrogen in processed water (T-N) is 10 mg/L or less, and as viewed from T-N removal rate is about 50%.

However, the conventional biological nitrogen removing method has a disadvantage in that quite a long time is required for processing and another disadvantage is, in the denitrifying reaction, since there is required a hydrogen donor such for example as methanol and hydrogen, as being an energy source of reducing power of denitrifying bacteria, processing cost is raised.

Furthermore, in the case of the conventional biological nitrogen removing method, there are required two tanks including a nitrifying tank, in which nitrifying reaction is performed in the aerobic condition and another tank, in which denitrifying reaction is performed in the anaerobic condition, whereby such disadvantages are presented that, the system is large-sized, and moreover, the provision of the two tanks necessitates an energy for circulating the waste water between the nitrifying tank and the denitrifying tank.

As described above, the conventional biological nitrogen removing method as being typified by activated sludge circulation modified method is not satisfied in the respects of the processing time, the processing cost, and making the system compact and so forth.

SUMMARY OF THE INVENTION

The present invention has been developed in view of the above-described circumstance and has as its object the provision of a nitrogen removing method and system and immobilized microorganisms (referred to as "media" in tables and units) used therefor, wherein processing time is very short, processing cost can be decreased and nitrogen removal can be performed by use of one tank.

To achieve the above-described object, according to the present invention, a nitrogen removing method compound in waste water and removing nitrogen is characterized in that oxidizing bacteria for oxidizing the nitrogen compound and at least one of a catalytically acting substance for converting an oxidizing intermediate product of the nitrogen compound, which is produced by being oxidized by the oxidizing bacteria into nitrogen and converting bacteria for reproducing nitrogen converting capacity of the catalytically acting substance are brought into contact with the waste water in the aerobic condition.

Furthermore, in order to achieve the above-described object, according to the present invention, a nitrogen removing system for biologically processing nitrogen compound in the waste water and removing nitrogen is characterized in that the aforesaid system comprises: a reaction tank, in which oxidizing bacteria for oxidizing a nitrogen compound and at least one of those including a catalytically acting substance for converting an oxidizing intermediate product of the nitrogen compound, which is produced by being oxidized by the oxidizing bacteria into nitrogen and converting bacteria for reproducing nitrogen converting capacity of the catalytically acting substance are brought into contact with the waste water in the aerobic condition; and a control means for controlling dissolved oxygen in the waste water in the reaction tank and a control means for controlling pH in the waste water in the reaction tank.

According to the present invention, oxidizing bacteria for oxidizing a nitrogen compound in the waste water and at least one out of those including a catalytically acting substance for converting an oxidizing intermediate product of the nitrogen compound produced by the oxidizing bacteria into nitrogen and converting bacteria for reproducing nitrogen converting capacity of the aforesaid catalytically acting substance are brought into contact with the waste water in the aerobic condition, so that reaction, in which an oxidized intermediate product of the nitrogen compound is converted into nitrogen at a stage before the oxidizing intermediate product of the nitrogen compound is moved to an oxidizing level of nitrous acid and nitric acid (hereinafter referred to as "short-cut type denitrifying reaction") can be efficiently performed.

In this case, in a case where the converting bacteria for reproducing the nitrogen converting capacity of the aforesaid catalytically acting substance is held at a high concentration (for example, $10^7$ cell/mL or more) in the waste water, the aforesaid catalytically acting substance, which has lost the nitrogen converting capacity is efficiently reproduced, so that the catalytically acting substance existing at a very small quantity such for example as iron in the waste water can be utilized. Accordingly, there is no need for adding or supplying the catalytically acting substance to the waste water.

Furthermore, in order to achieve the above-described object, the present invention is characterized in that the waste water containing ammonia are brought into contact with immobilized microorganisms, in which bacteria consisting of nitrifying bacteria mixed with iron oxidizing bacteria are entrapped in macromolecular gels, in the aerobic condition.

Furthermore, in order to achieve the above-described object, according to the present invention, a nitrogen removing system for biologically processing a nitrogen compound in the waste water and removing nitrogen is characterized in that the aforesaid system comprises: a reaction tank, in which oxidizing bacteria for oxidizing the nitrogen compound and at least one of those including a catalytically acting substance for converting an oxidizing intermediate product of the nitrogen compound, which is produced by being oxidized by the oxidizing bacteria, into nitrogen and converting bacteria for reproducing nitrogen converting capacity of the catalytically acting substance are brought into contact with the waste water in the aerobic condition; and a denitrifying tank provided at a latter stage of the reaction tank, for biologically performing denitrifying process in the anaerobic condition.

According to the present invention, the denitrifying tank for biologically performing denitrifying process in the anaerobic condition is provided at the latter stage of the short-cut type nitrogen removing system, so that, for example, oxidizing type nitrogen in the waste water, which was not able to be removed by the short-cut type nitrogen removing system, can be removed by the nitrifying tank.

Furthermore, in order to achieve the above-described object, according to the present invention, a nitrogen removing system for biologically processing a nitrogen compound in the waste water and removing nitrogen is characterized in that the aforesaid system comprises: a reaction tank, in which oxidizing bacteria for oxidizing the nitrogen compound and at least one of those including a catalytically acting substance for converting an oxidizing intermediate product of the nitrogen compound, which is produced by being oxidized by the oxidizing bacteria, into nitrogen and converting bacteria for reproducing nitrogen converting capacity of the catalytically acting substance are brought into contact with the waste water in the aerobic condition; and an organic matter removing means provided at a former stage of the reaction tank, for removing an organic matter in the waste water.

According to the present invention, the organic matter removing means for or removing the organic matter in the waste water is provided at a latter stage of a short-cut type nitrogen removing system, so that the iquantity of organic matter disturbing the short-cut type denitrifying reaction can be decreased and the efficiency of the short-cut type denitrifying reaction can be improved.

Furthermore, in order to achieve the above-described object, according to the present invention, the nitrogen removing system for biologically processing the nitrogen compound in the waste water and removing nitrogen is characterized in that the aforesaid system comprises: a first reaction tank, in which the waste water is brought into contact with the oxidizing bacteria for oxidizing the nitrogen compound in the aerobic condition; and a second reaction tank, in which effluent from the first tank and at least one of those including the catalytically acting substance for converting the oxidizing intermediate product of the nitrogen compound, which is produced by being oxidized by the oxidizing bacteria and converting bacteria for reproducing nitrogen converting capacity of the catalytically acting substance are brought into contact with each other in the aerobic condition.

According to the present invention, liquid obtained by bringing into contact the waste water containing ammonia with the nitrifying bacteria in the first reaction tank in the aerobic condition is brought into contact with at least one of those including the catalytically acting substance for converting the oxidizing intermediate product of the nitrogen compound, which is produced by being oxidized by the oxidizing bacteria into nitrogen and the converting bacteria for reproducing the nitrogen converting capacity of the aforesaid catalytically acting substance in the second reaction tank in the aerobic condition, so that nitrogen in nitric acid form can be produced and pH of the waste water can be lowered in the first reaction tank. Accordingly, the aerobic denitrifying can be facilitated without adding a pH adjusting agent in the second reaction tank. Further, when the liquid obtained in the second reaction is brought into the denitrifying bacteria in a third reaction tank in the anaerobic condition, nitrogen in nitrous acid form and nitrogen in nitric acid form can be reduced into nitrogen gas.

Further, in order to achieve the above-described object, according to the present invention, oxidizing bacteria being a mixture of one or two or more out of those including a plurality of bacteria having a nitrogen compound oxidizing enzyme such as nitrifying bacteria, methane oxidizing bacteria, organic chlorine compound decomposing bacteria and white mold, for oxidizing the nitrogen compound, a catalytically acting substance being a mixture of one or two or more out of those including a bivalent compound, a trivalent compound, magnetite, red hematite, limonite, magnetic iron ore, iron pyrite, activated carbon, fly ash, sulfur compound or a compound containing any one of copper, zinc and silicon, for converting oxidizing intermediate product of nitrogen compound, which is produced by being oxidized by the oxidizing bacteria into nitrogen, and converting bacteria being a mixture of one or two or more out of those including iron oxidizing bacteria, sulfur oxidizing bacteria and an activated sludge, for reproducing nitrogen converting capacity of the catalytically acting substance, are combined separately by every immobilized microorganisms or together, or three or two out of those including the above-described oxidizing bacteria, catalytically acting substance and converting bacteria are combined, and entrapped in the macromolecular gels.

According to the present invention, the immobilized microorganisms, in which the oxidizing bacteria, the catalytically acting substance and the converting bacteria are entrapped in the macromolecular gels, are used, whereby the contacting efficiency of the waste water with the oxidizing bacteria, the catalytically acting substance and converting bacteria, which is important in performing the short-cut type denitrifying reaction, can be improved, and these bacteria and substance can be prevented from flowing out of the reaction tanks, so that stabilized process can be performed.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a typified view explaining the concept of the immobilized microorganisms according to the present invention;

FIG. 3 is a diagram showing the rate of removing T-N in the short-cut type denitrifying reaction and the concentration of dissolved oxygen in the waste water;

FIG. 9 is a sectional view of a one-tank type nitrogen removing system in a fourth embodiment of the nitrogen removing system according to the present invention;

DETAILED DESCRIPTION OF THE PREFERRED EMBODIMENTS

Detailed description will hereunder be given of the preferred embodiment of a method and a system for removing nitrogen and generally fixed immobilized microorganisms according to the present invention with reference to the accompanying drawings.

FIG. 1 is the typified view explaining the nitrogen removing method according to the present invention. Description will hereunder be given of an ammonium nitrogen as being a main form as a nitrogen compound in the waste water.

The nitrogen removing method according to the present invention is characterized in that the short-cut type denitrifying reaction is performed, in which the ammonium oxidizing intermediate product produced by oxidizing the ammonium nitrogen in the waste water by oxidizing bacteria is converted into nitrogen before a stage, at which the intermediate product is moved to nitrous acid and nitric acid in the oxidizing level.

Figure 4:
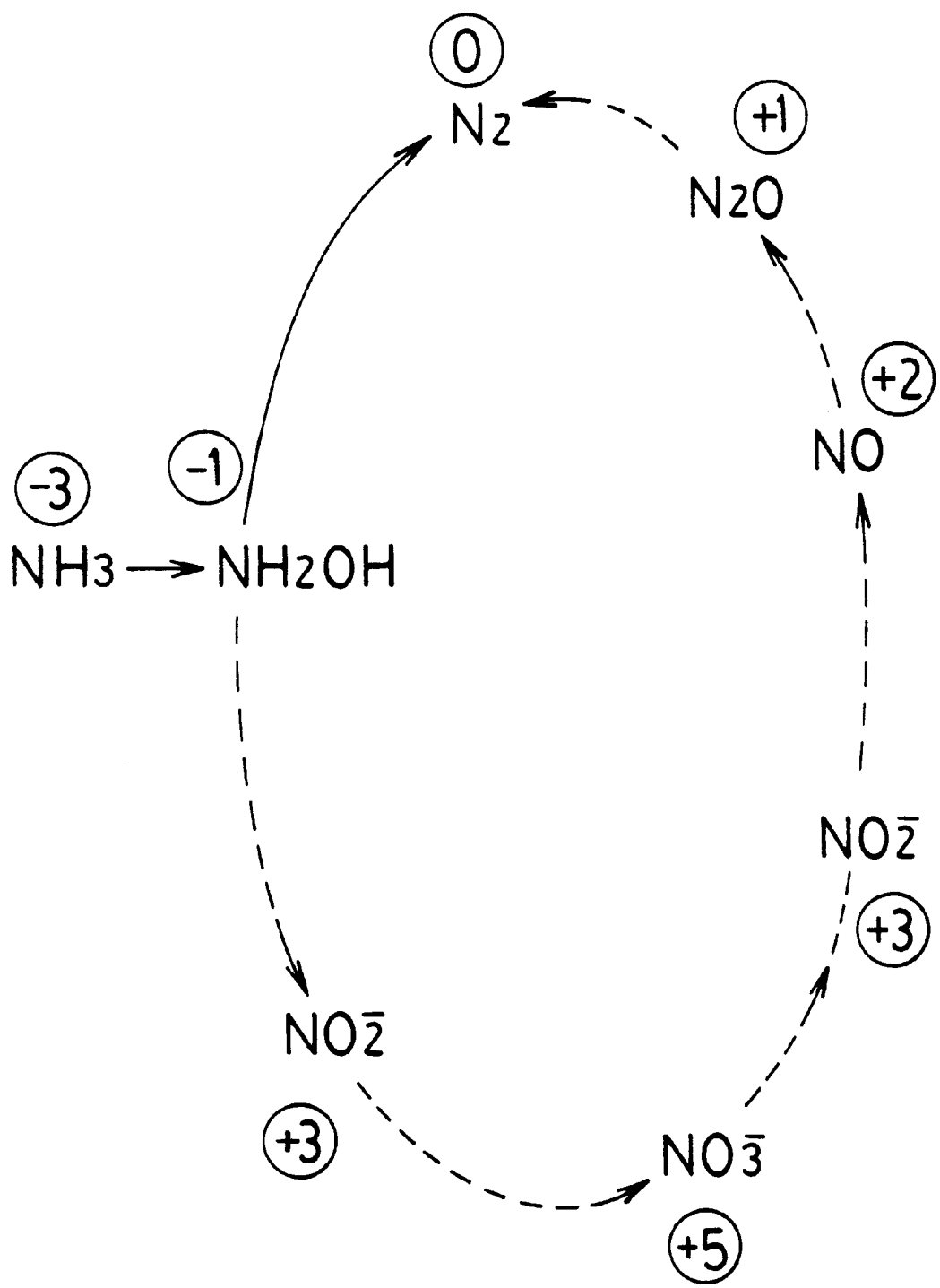
FIG. 4 is an explanatory view explaining the comparison of the short-cut type denitrifying reaction with the nitric acid type denitrifying reaction.

Here, the ammonium oxidizing intermediate product means the oxidizing intermediate product before ammonia are oxidized and move to nitrous acid and nitric acid in the oxidizing level, and is regarded as hydroxylamine ($NH_2OH$) (Refer to FIG. 4).

According to the present invention, the waste water containing ammonium nitrogen is brought into contact with the oxidizing bacteria for oxidizing ammonia and the catalytically acting substance for converting the ammonium oxidizing product produced by being oxidized by the oxidizing bacteria into nitrogen, so that ammonia in the waste water are denitrified in the aerobic condition in accordance with the following reaction formula.

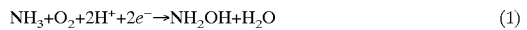

$$NH_3+O_2+2H^++2e^- \rightarrow NH_2OH+H_2O \quad (1)$$

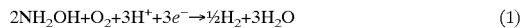

$$2NH_2OH+O_2+3H^++3e^- \rightarrow \frac{1}{2}H_2+3H_2O \quad (1)$$

That is, in the short-cut type denitrifying reaction, reaction of the formula (1) is facilitated by the oxidizing bacteria, and subsequently, reaction of the formula (2) is facilitated by the catalytically acting substance, so that ammonia ($NH_4$) in the waste water are denitrified to be nitrogen ($N_2$). The both reactions are performed in the aerobic condition.

As the oxidizing bacteria for oxidizing ammonia in the waste water, a mixture of one or two or more out of those including a plurality of bacteria having an ammonium oxidizing enzyme such as the nitrifying bacteria, methane oxidizing bacteria, organic chlorine compound decomposing bacteria and white mold can be used.

As the catalytically acting substance for converting the oxidizing product produced by being oxidized by the oxidizing bacteria into nitrogen, a mixture of one or two or more out of those including a bivalent compound, a trivalent compound, magnetite, red hematite, limonite, magnetic iron ore, iron pyrite, activated carbon, fly ash, a sulfur compound and a compound containing any one of copper, zinc and silicon can be used.

Here, as the bivalent compound, one containing copper, zinc and manganese can be listed, and as the trivalent compound, one containing aluminum, chrome and the like can be listed.

Figure 2:
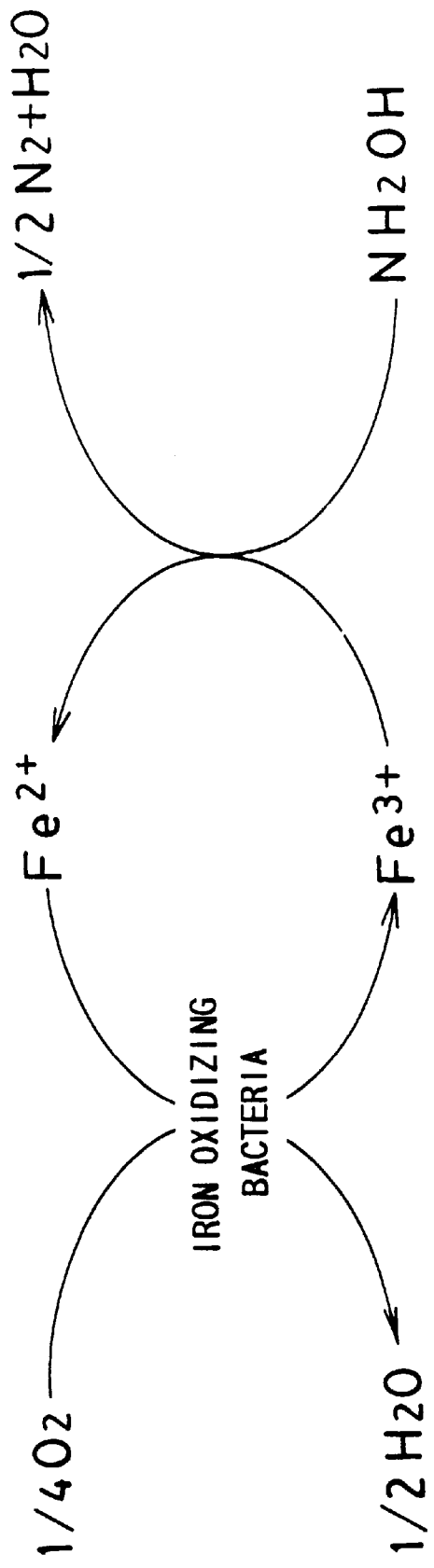
FIG. 2 is an explanatory view explaining the role of the converting bacteria.

Then, in the short-cut type denitrifying reaction, when the converting bacteria for reproducing the nitrogen converting capacity of the catalytically acting substance is made to coexist at a high concentration (for example, $10^7$ cell/mL or more) in the waste water, the catalytically acting substance which has lost the converting capacity can be reproduced very efficiently. Accordingly, the catalytically acting substance existing in a very small quantity, for example, iron existing at about 0.1 mg/L can be utilized, and it is not necessary to add or supply the catalytically acting substance into the waste water. FIG. 2 shows a reproduction cycle of the nitrogen converting capacity when the iron oxidizing bacteria are used as the converting bacteria.

As the converting bacteria for reproducing the nitrogen converting capacity of the catalytically acting substance, a mixture of one or two or more out of those including the iron oxidizing bacteria, the sulfur oxidizing bacteria and the activated sludge can be used.

The nitrogen removing method through the contact of the waste water with the oxidizing bacteria, the catalytically acting substance and the converting bacteria according to the present invention as described above is applicable to every cases including a case where these materials are in a floating state in the reaction tank, a case where these materials exist while they are attached by being fixed to media to be attached and fixed and further a case where they exist in a state of being entrapped in the macromolecular gels.

However, in the case of floating state, it is necessary that the catalytically acting substance, for example, iron, is made to exist in the waste water at 10 mg/L or more all the time, and iron is regarded as one existing in the activated sludge, it is desirable that it exist at a value of 100 mg/g-solid material or more. Furthermore, it is desirable that pH in the waste water is about 4–5 for facilitating the short-cut type denitrifying reaction.

However, actually, since the processing performance is liable to be lowered due to the flow-out from the reaction tank, it is desirable that the contact with the waste water is brought about in a shape of being entrapped in the macromolecular gels rather than the case of floating state, or in a shape of being the attachedly fixed media, i.e. a shape of being attached to media to be attached.

As the macromolecular gels for entrapping therein with the oxidizing bacteria, the catalytically acting substance and the converting bacteria, for example, polyethylene glycol, polyethylene glycol prepolymer, polyvinyl alcohol, polyurethane acrylate, acrylamide, polyvinyl formal, agar-agar, carrageenan, and alginate can be used.

In a case where the oxidizing bacteria, the catalytically acting substance and the converting bacteria are entrapped in the macromolecular gels, these bacteria and materials may be entrapped in the gels separately from each other by every immobilized microorganisms, or may be entrapped in the gels in single immobilized microorganisms together. Further, two out of these three (the oxidizing bacteria and the catalytically acting substance, the catalytically acting substance and the converting bacteria, or the oxidizing bacteria and the converting bacteria) may be combined and entrapped in the gels and the remaining one may be entrapped in the gels singly.

However, in the short-cut type denitrifying reaction, since it is desirable that the ammonium oxidizing product produced by the oxidizing bacteria is not moved to be nitrous acid and nitric acid and quickly denitrified to be nitrogen, it is desirable that all three are entrapped in the gels together, or the oxidizing bacteria and the catalytically acting substance are entrapped together.

Furthermore, as the attached media, to which the oxidizing bacteria, the catalytically acting substance and the converting bacteria are attached, porous media, ceramics, plastic and the like in addition to the macromolecular gels obtained by setting up polyethylene glycol, polyvinyl alcohol, acrylamide, polyvinyl formal and so forth can be used. As the shape of the attached immobilized microorganisms, a honey-comb shape or a plate member having an enlarged wavy board surface may be adopted, or the oxidizing bacteria, the catalytically acting substance and the converting bacteria may be attached to the surfaces of the granular materials of the macromolecular gels. In a case where the macromolecular gels are used as the attached media, since the catalytically acting substance has no adherence, it is necessary to fix in a manner to be embedded in the surfaces of the macromolecular gels in a partially exposed state. As the method of attachedly fixing, there is such a method that the oxidizing bacteria and the converting bacteria are naturally attached to the attached media, to which the catalytically acting substance is forcedly attached. As described above, since the bivalent compound, the trivalent compound, magnetite, red hematite, limonite, magnetic iron ore, iron pyrite, the activated carbon, fly ash and the sulfur compound, or minerals such as copper, zinc and silicon have no adherence to the attached media, it is necessary to use binders and the like for forcedly attaching them to the media.

Furthermore, as a modification example of the method of making the oxidizing bacteria, the catalytically acting substance and the converting bacteria attachedly fixed, by making a material containing a content of the catalytically acting substance, for example an iron plate, to be attached media, the oxidizing bacteria and the converting bacteria may be naturally attached to this iron plate. In this case, the iron plate itself fulfills the duty as the catalytically acting substance.

FIG. 3 is a diagram showing the relationship between the total nitrogen (T-N) removing rate (mg-N/h·L-media) and the level of dissolved oxygen in the reaction tank in the short-cut denitrifying reaction. From FIG. 3, it is considered that as the level of dissolved oxygen in the reaction tank for removing nitrogen by performing the short-cut denitrifying reaction according to the present invention, at least 0.1 mg/L or more is necessary. That is, as for the T-N removing rate, it is desirable that 50% is required as described above, but, if the lowest limit of 25% is fulfilled, then, the T-N removing rate is practicable. When this is viewed from the T-N removing rate, if 5 (mg-N/h·L-media) is fulfilled, then, T-N removing rate of 25% can be secured. Then, in order to obtain 5 (mg-N/h·L-media) in the T-N removing rate, as the level of dissolved oxygen, at least 0.1 mg/L or more is required.

FIG. 4 is a diagram showing the comparison between the short-cut type denitrifying reaction (indicated with a solid line in the drawing) in the nitrogen removing method according to the present invention and the nitric acid type denitrifying reaction (indicated with dotted lines in the drawing) in the conventional nitrogen removing method.

As apparent from FIG. 4, in the short-cut type denitrifying reaction in the nitrogen removing method according to the present invention, the ammonium oxidizing product ($NH_2OH$) produced by the oxidizing bacteria becomes nitrogen after one step, whereas, in the nitric acid type denitrifying reaction in the conventional nitrogen removing method, nitrogen is obtained after six steps.

As described above, by performing the nitrogen removing method using the short-cut type denitrifying reaction according to the present invention, ammonia in the waste water can be removed in a very short processing time. Furthermore, since both the reaction of making ammonium into the ammonium oxidizing product and the reaction of converting the ammonium oxidizing product into nitrogen are aerobic reactions, it is not necessary to provide the two tanks including the nitrifying tank requiring the aerobic condition and the denitrifying tank requiring the anaerobic condition as in the past, whereby one treating tank is enough. Further, since expensive hydrogen donors as in the denitrifying reaction using the denitrifying bacteria in the past, as combined with short processing time, the processing cost can be decreased greatly.

Figure 5:
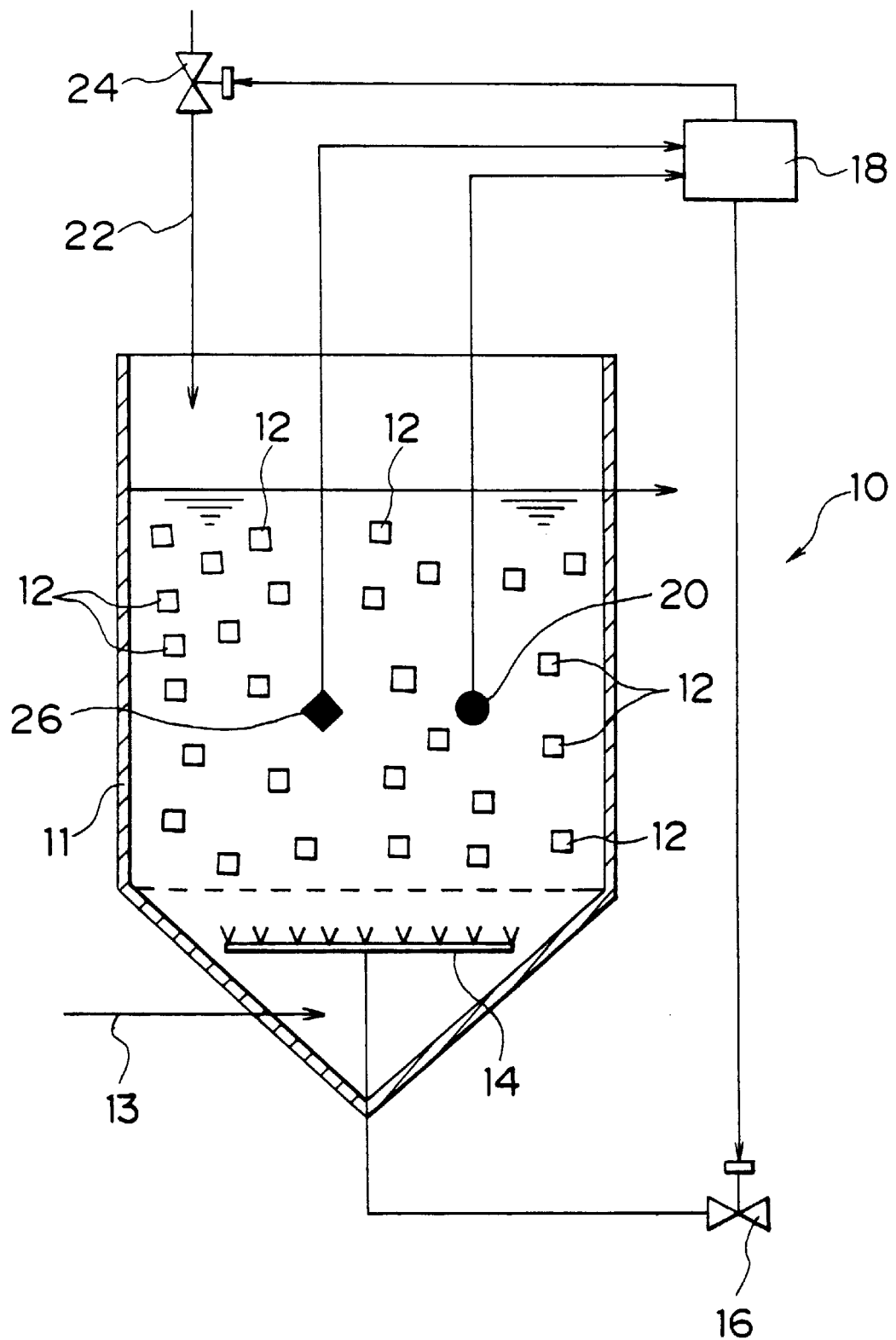
FIG. 5 is a sectional view explaining the first embodiment of the nitrogen removing system according to the present invention.

FIG. 5 is the schematic sectional view showing the first embodiment of the nitrogen removing system, to which is applied the nitrogen removing method according to the present invention, and shows the case where the oxidizing bacteria, the catalytically acting substance and the converting bacteria are generally entrapped in common macromolecular gel (Refer to FIG. 1).

As shown in FIG. 5, generally immobilized microorganisms 12, in which all of the oxidizing bacteria, the catalytically acting substance and the converting bacteria are generally entrapped in common macromolecular gel, are thrown into a reaction tank 11, into which the waste water containing ammonium nitrogen flows from an original water supply pipe 13. An aeration device 14 is provided at the bottom portion of the reaction tank 11 and an adjusting valve 16 for adjusting an aeration value of this aeration device 14 is connected to a DO (dissolved oxygen) measuring sensor 20 provided in the reaction tank 11 through a controller 18. With this arrangement, the aeration value from the aeration value from the aeration device 14 is controlled such that the level of dissolved oxygen in the waste water in the reaction tank 11 becomes 0.1 mg/L or more. Furthermore, a pH adjusting liquid pouring piping 22 is provided in the reaction tank 11 and an adjusting valve 24 for adjusting a pour-in value of the pH adjusting liquid pouring piping 22 is connected to a pH measuring sensor 26 provided in a processing tank 10 through the controller 18. With this arrangement, pH of the waste water in the reaction tank 11 is controlled to 4–8.

As for pH range of the waste water, as in this embodiment, when the catalytically acting substance can be entrapped in the gels and maintained at a high concentration and it is not necessary to maintain the converting bacteria at the above-described high concentration, pH 4–8 is satisfactory. However, as will be described hereunder, in a case where iron of a very small quantity and the like in the waste water are utilized as the catalytically acting substance, it is desirable that the converting bacteria are maintained at a high concentration, and simultaneously, pH in the waste water is maintained at 4–6.5.

According to the present invention, performing a high load operation (a volume load is 0.8 kg-N/m$^3$·day or more) is effective, and, when the remaining nitrogen oxidizing materials is subjected to the post treatment, in accordance with the present invention, the T-N removing rate can be improved.

Figure 6:
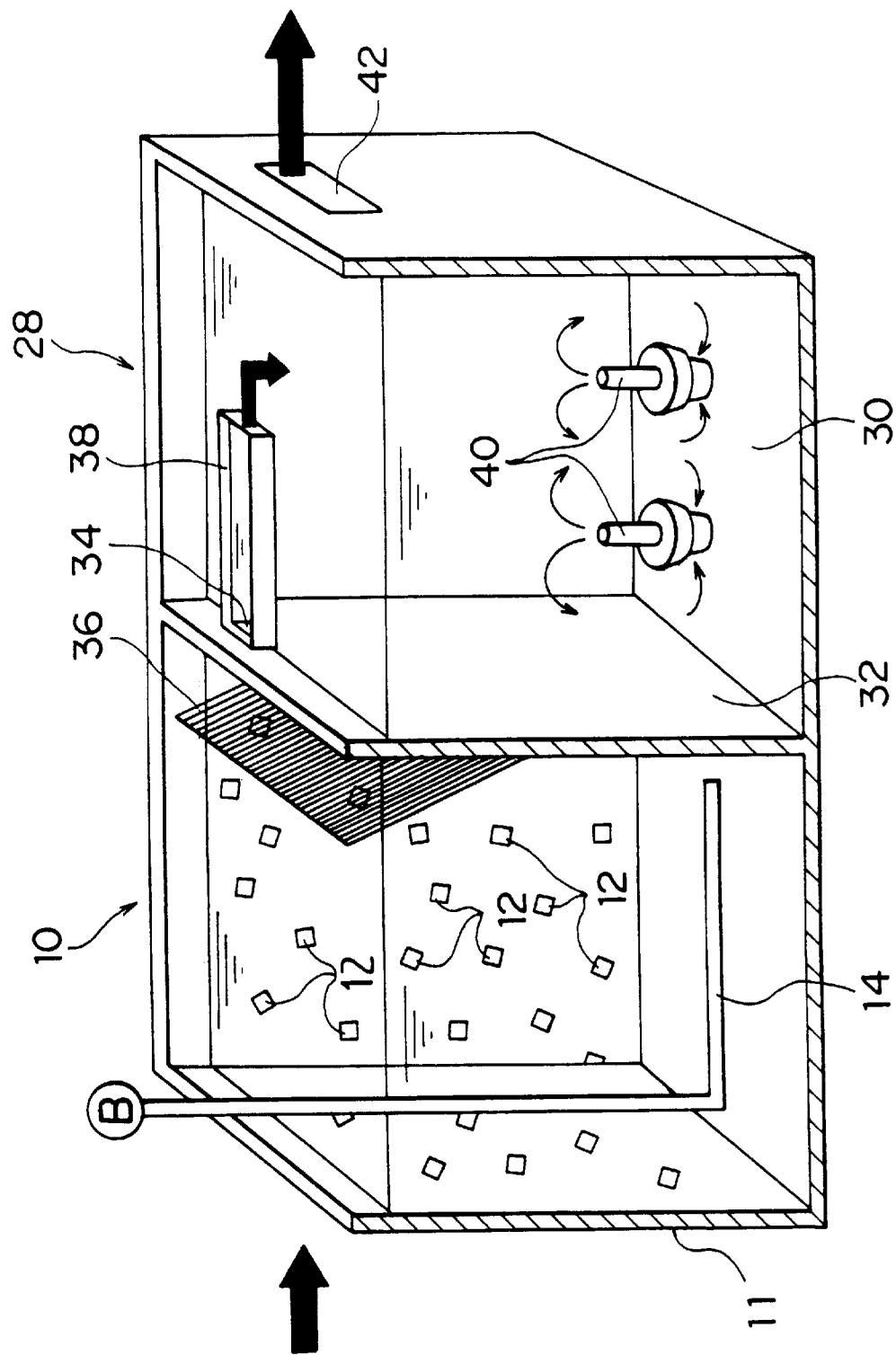
FIG. 6 is a sectional view explaining the second embodiment of the nitrogen removing system according to the present invention.

FIG. 6 is the second embodiment of the present invention, which is constructed for performing the high load operation, and shows the case, where an anaerobic denitrifying device 28 is provided at a latter stage of a nitrogen removing device 10 described in FIG. 5 and the processed water which has been processed in the nitrogen removing device 10 is further denitrified by the denitrifying bacteria in the anaerobic denitrifying device 28. Incidentally, the DO (dissolved oxygen) sensor, the pH measuring sensor, the controller and the like which are described in FIG. 5 are omitted in FIG. 6.

As shown in FIG. 6, the reaction tank 11 of the nitrogen removing device 10 is divided from a denitrifying tank 30 by a partition wall 32, and a water supply part 34 for supplying the liquid processed in a reaction tank 11 is opened in the upper portion of the partition wall 32. The immobilized microorganisms 12, in which all of the oxidizing bacteria, the catalytically acting substance and the converting bacteria are entrapped in the gels, are thrown into the reaction tank 11, the aeration device 14 is provided at the bottom portion of the reaction tank 11 and a screen 36 is inclinedly provided on the partition wall 32 on the side of the reaction tank 11. The immobilized microorganisms 12 in the reaction tank 11 can be prevented from flowing into a denitrifying tank 30 from the reaction tank 11 by this screen 36. On the other hand, the activated sludge is thrown into the denitrifying tank 30, an agitator 40 for slowly agitating the liquid in the denitrifying tank 30 is provided at the bottom portion of the denitrifying tank 30, and further, a water supply path 38 is provided on the partition wall 32 on the side of the denitrifying tank 30 and connected to the aforesaid water supply port 34.

Then, the processed liquid processed in the reaction tank 11 flows into the denitrifying tank 30 through the water supply path 38 under an air lift action by the aeration device 14, and is subjected to the conventional anaerobic denitrifying and discharged from the system through a discharge port 42.

When the system is constructed as in FIG. 6, denitrifying is not performed by the short-cut type denitrifying reaction in the reaction tank 11 performing the high load operation, and the oxidizing product, which has been moved to nitrous acid and nitric acid, can be positively denitrified in the anaerobic denitrifying device 28.

Furthermore, the nitrogen removing method according to the present invention is liable to be disturbed by the highly concentrated organic matter, and, in a case of the waste water containing ammonia, which further contains the highly concentrated organic matter, when the organic matter is removed by a preliminary treatment, the short-cut type denitrifying can be effectively performed.

Figure 7:
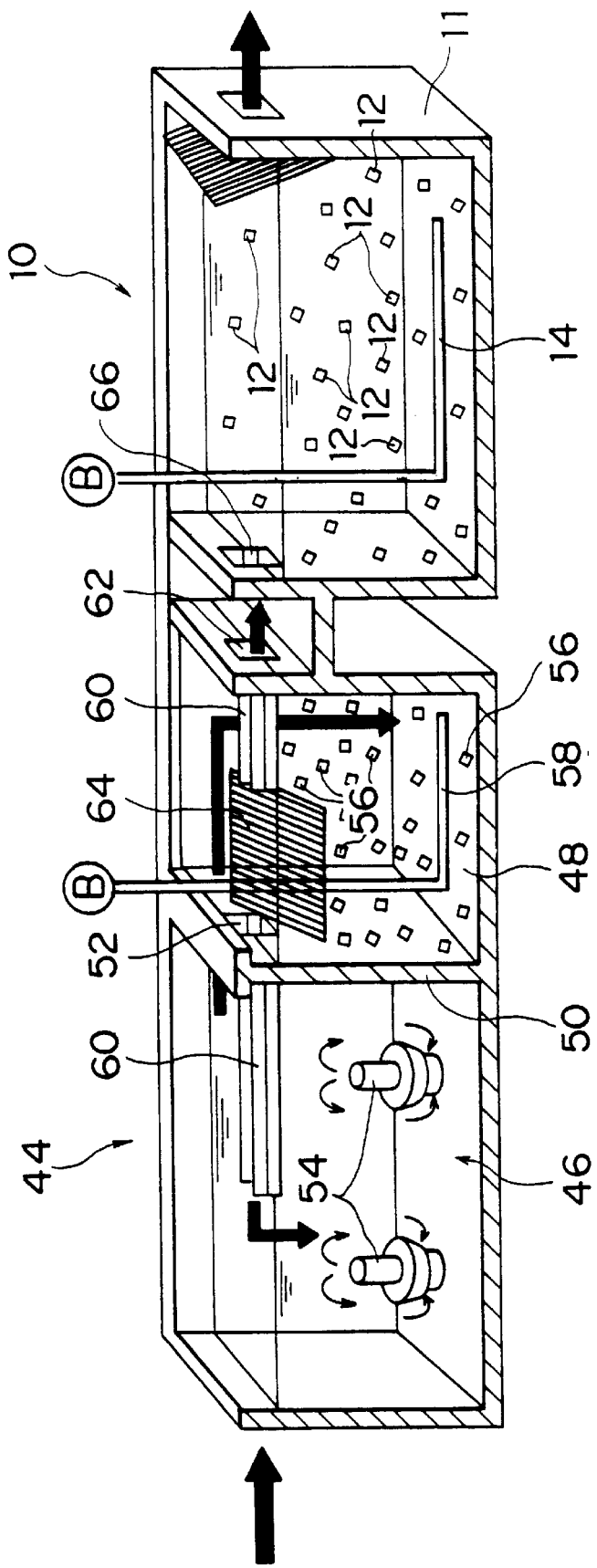
FIG. 7 is a sectional view explaining the third embodiment of the nitrogen removing system according to the present invention.

FIG. 7 explains the third embodiment of the present invention and shows an example of a preferable construction in the case of the waste water containing ammonium nitrogen, which further contains the highly concentrated organic matter. That is, a conventional nitrifying and denitrifying type nitrogen removing system 44 is provided at a former stage of the reaction tank 11 as being the short-cut type nitrogen removing device 10 described in FIG. 6, and the processed water processed in the nitrogen removing system 44 is denitrified in the aerobic condition in the nitrogen removing device 10.

As shown in FIG. 7, the nitrogen removing system 44 includes a denitrifying tank 46 and a nitrifying tank 48, the denitrifying tank 46 is divided from the nitrifying tank 48 by a partition wall 50 and a communication port 52 for communicating the denitrifying tank 46 with the nitrifying tank 48 is formed on the upper portion of the partition wall 50. The activated sludge is thrown into the denitrifying tank 46 and an agitator 54 is provided at the bottom portion of the denitrifying tank 46. Immobilized microorganisms 56, in which the nitrifying bacteria are entrapped in the gels are thrown into the nitrifying tank 48, and an aeration device 58 is provided at the bottom portion of the nitrifying tank 48. Then, a circulating water path 60 penetrating through the communication port 52 and being extended to about the central position of the denitrifying tank 46 is provided in the upper portion of the nitrifying tank 48, and one end of the circulating water path 60 communicates with a discharge port 62 of the nitrifying tank 48. Further, a screen 64 is provided in the nitrifying tank 48 and the immobilized microorganisms 56 in the nitrifying tank 48 are prevented from flowing out into the circulating water path 60. Then, the waste water containing ammonium nitrogen flows into the nitrogen removing system 44 where the nitrifying-denitrifying process is performed. The nitrifying liquid nitrified in the nitrifying tank 48 overflows to the circulating water path 60 under the air lift action by air from the aeration device 58, a part of the overflowing nitrifying liquid is circulated to the denitrifying tank 46, and the remaining liquid flows through the discharge port 62 and is supplied to the short-cut type nitrogen removing device 10.

In the case where the system is constructed as in FIG. 7, not only the nitrogen removal is performed in the nitrifying-denitrifying type nitrogen removing system 44, but also the organic matter is consumed as a nutritive source (hydrogen donor) for the denitrifying bacteria in the denitrifying reaction, so that a content of the organic matter in the water supplied to the short-cut type nitrogen removing device 10 can be decreased. With this arrangement, disturbance by the organic matter in the short-cut type denitrifying reaction in the nitrogen removing device 10 can be prevented. Further, due to the construction shown in FIG. 7, the temperature of the waste water is low and the activity of the oxidizing bacteria, for example, the nitrifying bacteria is decreased, whereby the nitrifying rate (oxidizing reaction of ammonia) is slow, whereby the nitrifying from hydroxylamine to nitrous acid is not moved smoothly, so that the construction is suitable for a case where hydroxylamine remains much in the nitrifying liquid and suitable for the countermeasure against winter season of the existing nitrogen removing device 30.

Here, detailed description will be given of the influence of pH in the reaction (1) described above.

Figure 8:
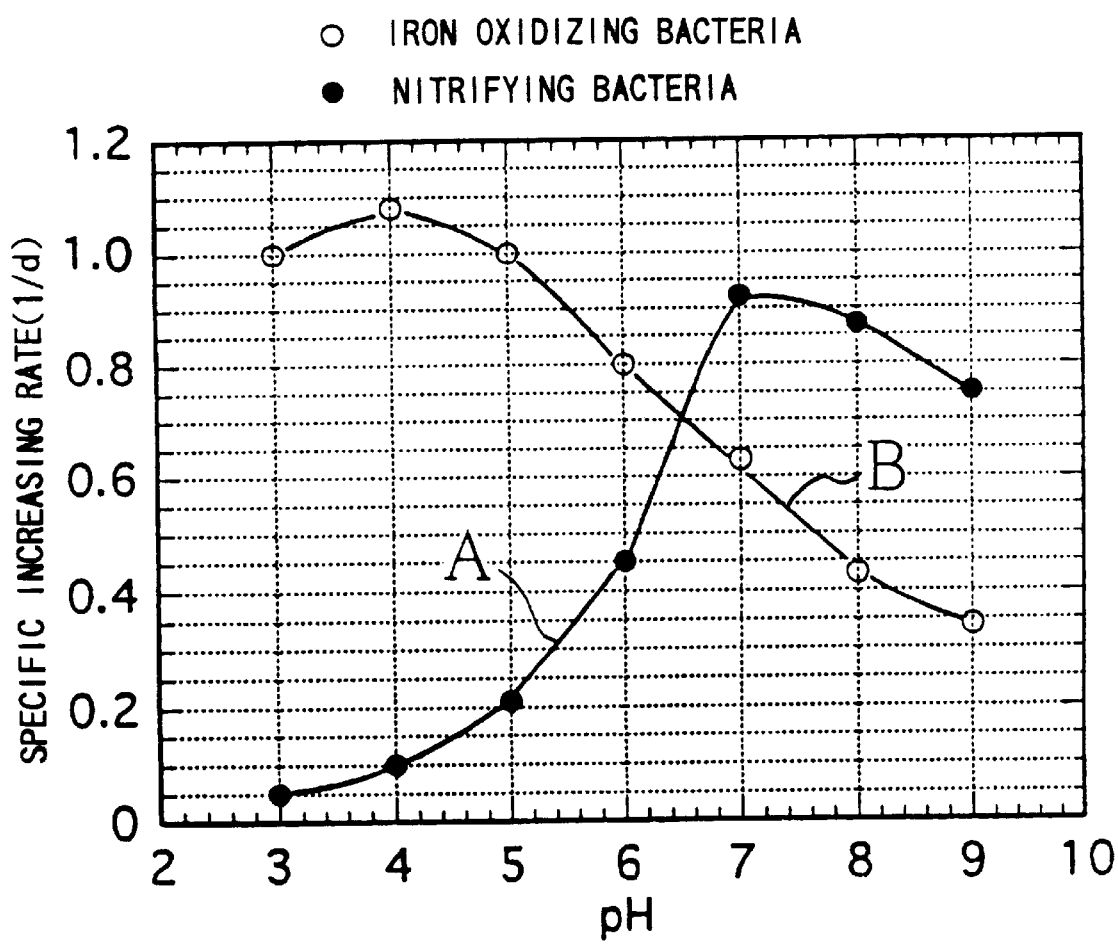
FIG. 8 is an explanatory view explaining the relationship between the short-cut type nitrogen removing method according to the present invention and pH of the waste water.

FIG. 8 shows the relationship between a specific increasing rate of the nitrifying bacteria as being a typical example of the oxidizing bacteria and pH of the waste water at the time of reaction and the relationship between a specific increasing rate of the iron oxidizing bacteria as being a typical example of the converting bacteria and pH of the waste water at the time of reaction. Incidentally, the specific increasing rate is shown in the formula (3) and, the larger the specific increasing rate is, the more active the reaction becomes. In order to perform the active reaction, it is desirable that, normally, the specific increasing rate is 0.6 or more.

$$dX/dt = \mu X \qquad (3)$$

where $\mu$ is specific increasing rate (1/d), X is number of bacteria (cell/mL-media), and t is cultivated time (d).

As apparent from FIG. 8, with the nitrifying bacteria (curve A), when pH is increased from 3, if pH exceeds 6, then, the specific increasing rate becomes about 0.6, and at pH 7, the specific increasing rate reaches the largest value of 0.9, and thereafter, the specific increasing rate is lowered and, at pH 9, the specific increasing rate becomes about 0.75. Accordingly, the most suitable pH of the nitrifying bacteria is 6–9, preferably 7–9, and the reaction of the nitrifying bacteria becomes most active in this range, whereas, when pH is less than 6, the reaction becomes slow. From this, it is assumed that, when the waste water containing ammonium nitrogen is brought into contact with the nitrifying bacteria in the aerobic condition, at pH 6–9, ammonium nitrogen is quickly oxidized to nitrogen in nitrous acid form and nitrogen in nitric acid form, which are the find oxidizing product, and, when pH is less than 6, the time of staying in a state of hydroxylamine being the intermediate product becomes long.

With the iron oxidizing bacteria (curve B), when pH is increased from 3, if pH is about 4, then the specific increasing rate reaches the largest value of 1.1, and, thereafter, the specific increased rate is gradually lowered and, at about pH 6, the specific increasing rate becomes about 0.6. Accordingly, the most suitable pH of the iron oxidizing bacteria is 3–6, preferably 3–5, the reaction of the iron oxidizing bacteria becomes most active in this range, whereas, when pH is more than 6, the reaction becomes slow.

Accordingly, there is set pH condition satisfying both the decreased specific increasing rate of the nitrifying bacteria and the increased specific increasing rate of the iron oxidizing bacteria, so that the course of $NH_4 \rightarrow NH_2OH \rightarrow N_2$ can be facilitated preferentially. Then, as pH satisfying this condition is preferably 4–6.5.

That is, if the new catalytically acting substance, which can convert hydroxylamine into nitrogen, can be added into the waste water in large quantities all the time, then, the specific increasing rate of the iron oxidizing bacteria does not matter much. However, actually this is impossible from the economical reason and the like. Accordingly, in order to efficiently reproduce the catalytically acting substance, which has lost the capacity of converting into nitrogen, it becomes important that the specific increasing rate of the iron oxidizing bacteria as being the converting bacteria is secured above the predetermined value. For this, it is desirable that the lower limit of pH is set at 4.

Furthermore, since both of the oxidizing of ammonium nitrogen by the nitrifying bacteria and the oxidizing of hydroxylamine of the iron oxidizing bacteria are performed in the aerobic condition, process by use of one reaction tank is possible. In a case where process is performed by use of one reaction tank, in order to facilitate the nitrifying in the aerobic condition, the pH adjusting agent may be added to the waste water, whereby pH of the waste water may be adjusted to 4–6.5.

As a method, in which pH of the waste water is adjusted to 4–6.5 without using the pH adjusting agent, two reaction tanks are provided, and a liquid, in which the waste water containing ammonia is brought into contact with the nitrifying bacteria in the aerobic condition in the first reaction tank, may be brought into contact with the nitrifying bacteria and the iron oxidizing bacteria in the aerobic condition in the second reaction tank. That is, in the first reaction tank, nitrogen in nitrous acid form and nitrogen in nitric acid form are produced and pH of the waste water is lowered. Accordingly, in the second reaction tank, the denitrifying in the aerobic condition can be facilitated without adding the pH adjusting agent. Further, when the liquid from the second reaction tank is brought into contact with the denitrifying bacteria in the anaerobic condition in the third reaction tank, the remaining nitrogen in nitrous acid form and nitrogen in nitric acid form in the waste water can be reduced into nitrogen gas.

FIG. 9 is the sectional view of the one-tank type nitrogen removing system in the fourth embodiment of the present invention, which is constructed such that pH in the waste water can be adjusted to 4–6.5. Furthermore, this is an example, in which the nitrifying bacteria as being the oxidizing bacteria and the iron oxidizing bacteria as being the converting bacteria are held at the high concentration and the catalytically acting substance is not added to the reaction tank in particular.

As shown in FIG. 9, a one-tank type nitrogen removing system 100 mainly includes: an original water supply pipe 112 for the waste water containing ammonium nitrogen; a reaction tank 114, into which immobilized microorganisms 115, wherein mixed bacteria consisting of two bacteria including the nitrifying bacteria and the iron oxidizing bacteria are generally entrapped in the gels, are thrown in; an aeration device 116 provided at the bottom portion of the reaction tank 114; an adding piping 118 for adding a pH adjusting agent for adjusting pH in the waste water to 4–6.5; a screen 120 provided at a treated liquid discharge port of the reaction tank 114, for preventing the immobilized microorganisms from flowing out; and a treated liquid discharge pipe 122.

In the one box type nitrogen removing system 100 in the fourth embodiment of the present invention, ammonium nitrogen in the waste water can be removed in the aerobic condition in the reaction course of $NH_4 \rightarrow NH_2OH \rightarrow N_2$, so that it is not necessary to convert ammonium nitrogen into nitrogen in nitrous acid form and nitrogen in nitric acid form, which are the final oxidizing product.

Accordingly, the processing time can be shortened, and simultaneously, since the nitrifying in the anaerobic condition by the nitrifying bacteria is not performed, methanol and the organic matter as being the hydrogen donor are not required.

Figure 10:
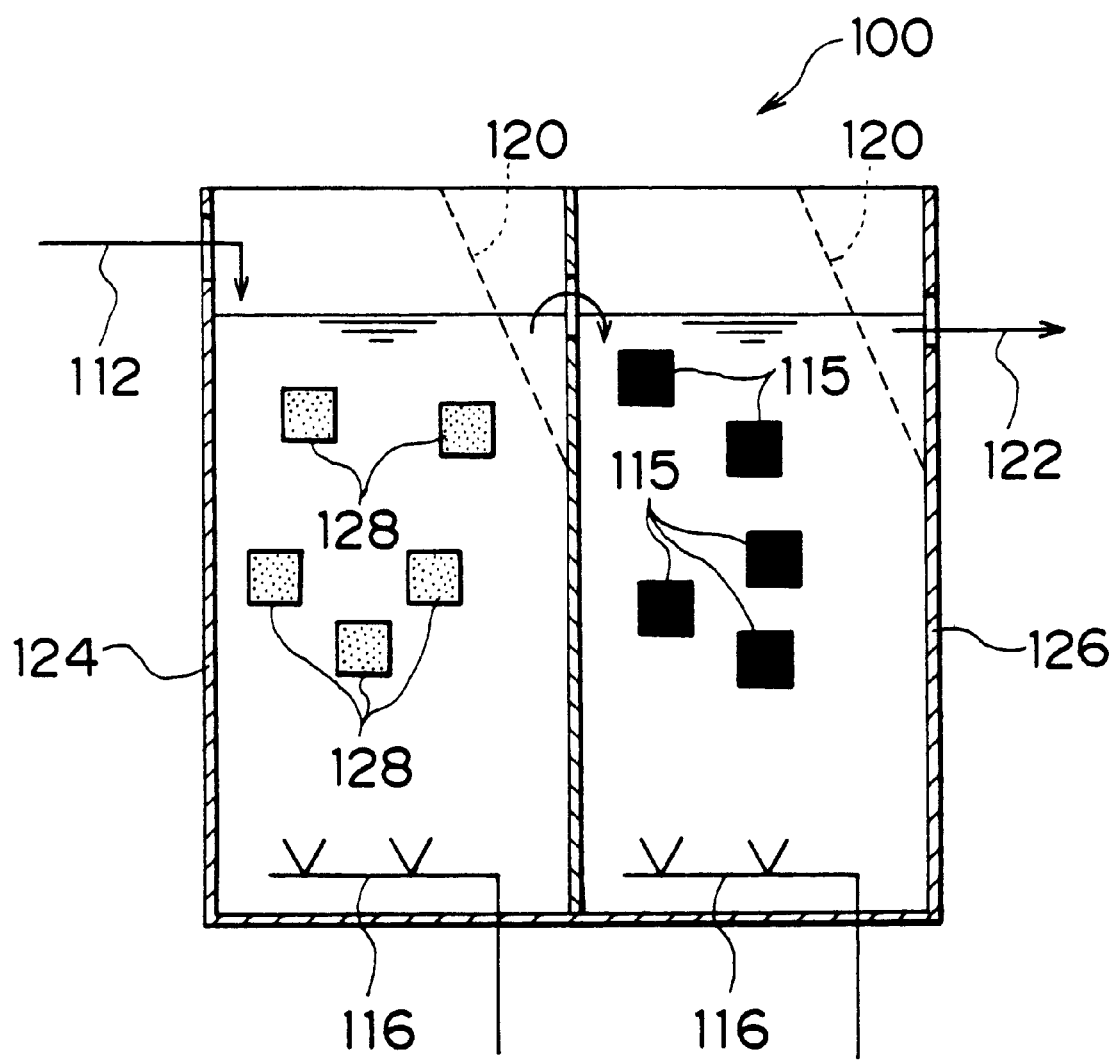
FIG. 10 is a sectional view explaining a two-tank type nitrogen removing system in the fourth embodiment of the nitrogen removing system according to the present invention.

FIG. 10 is the sectional view of the two-tank type nitrogen removing system in the fourth embodiment of the present invention, in which pH in the waste water can be adjusted to 4–6.5.

The two-tank type nitrogen removing system is adopted in a case where a first reaction tank 124 and a second reaction tank 126 are used. The system constructions of the respective tanks 124 and 126 are similar to the above except for that the adding piping 118 for the pH adjusting agent in the above-described one-tank type nitrogen removing system is not provided. Then, first immobilized microorganisms 128, in which the nitrifying bacteria are entrapped in the gels, are thrown into the first reaction tank 124, second immobilized microorganisms 115, in which the nitrifying bacteria and the iron oxidizing bacteria are entrapped in the gels are thrown into the second reaction tank 126, and liquid processed in the first reaction tank 124 is supplied to the second reaction tank 126.

In the two-tank type nitrogen removing system in the fourth embodiment of the present invention, the waste water containing ammonia flows into the first reaction tank 124 firstly, and is brought into contact with the first immobilized microorganisms 128 in the aerobic condition. In this case, when pH of the waste water, which flows in, is not in the range of 6–9, pH should be adjusted to this range. With this arrangement, in the first reaction tank 124, ammonium nitrogen is actively oxidized (nitrified), whereby nitrogen in nitrous acid form and nitrogen in nitric acid form are produced, so that pH in the waste water is lowered. Then, the liquid whose pH is lowered to about 6 is supplied to the second reaction tank 126. In the second reaction tank 126, ammonium nitrogen in the waste water is brought into contact with the second immobilized microorganisms 115 in the aerobic condition, whereby nitrogen in nitrous acid form and nitrogen in nitric acid form are produced by the nitrifying bacteria in the second immobilized microorganisms 115, whereby pH is further lowered, and, when pH is lowered to 4–6.5, which is the most suitable pH range of the iron oxidizing bacteria, the reaction of the nitrifying bacteria becomes slow and hydroxylamine is produced preferentially. Further, hydroxylamine is denitrified in the aerobic condition, whereby hydroxylamine is oxidized into nitrogen gas by the iron oxidizing bacteria in the second immobilized microorganisms 115, before hydroxylamine is converted into nitrogen in nitrous acid form and nitrogen in nitric acid form.

Accordingly, in the two-tank type nitrogen removing system according to the present invention, the same effect as in the one-tank type nitrogen removing system can be obtained, and moreover, the provision of the first reaction tank 124 makes it unnecessary that pH in the waste water is adjusted to 4–6.5 by the pH adjusting agent and the like in the second reaction tank 126.

Figure 11:
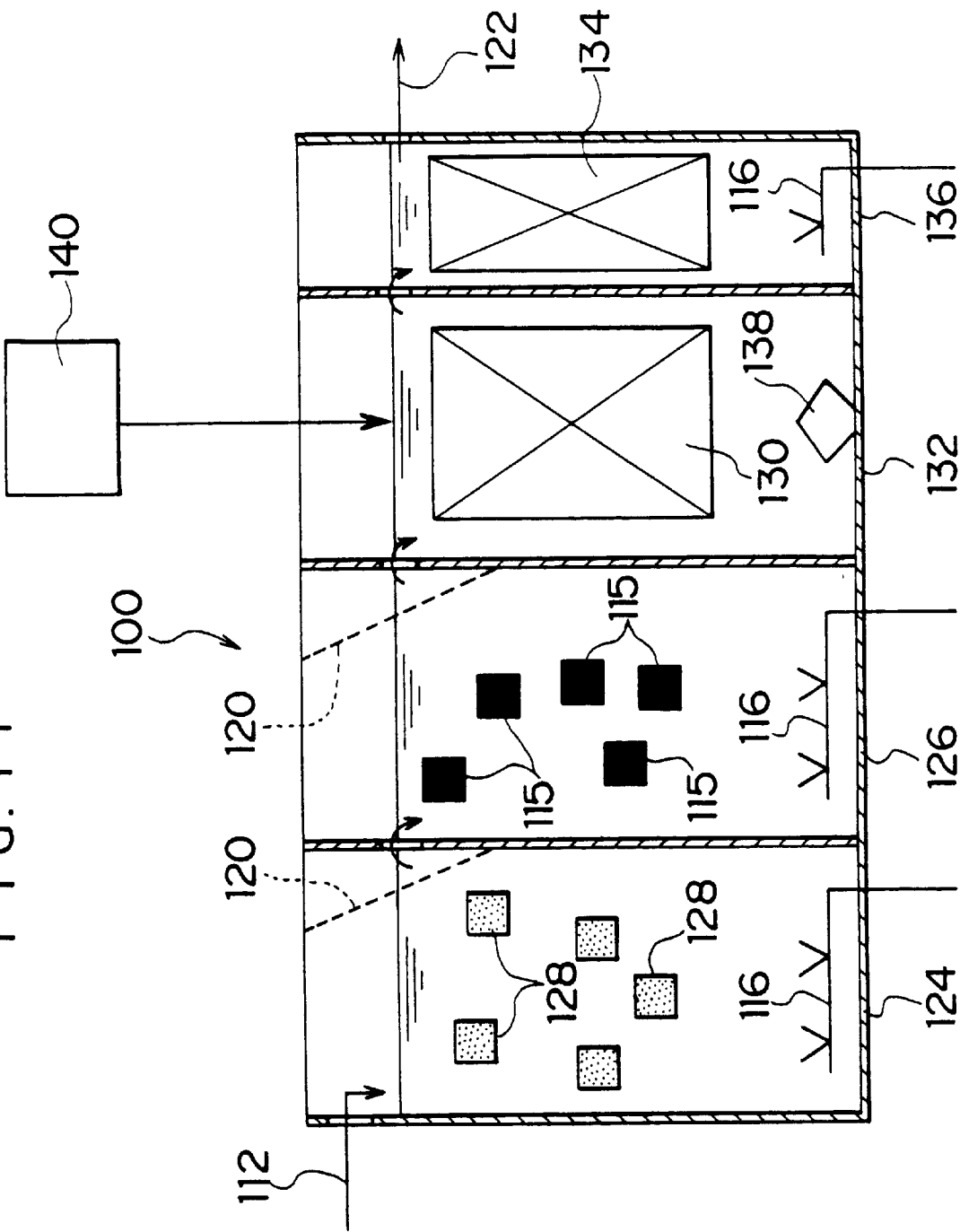
FIG. 11 is a sectional view explaining a four-tank type nitrogen removing system in the fourth embodiment of the nitrogen removing system according to the present invention.

FIG. 11 is the sectional view showing the four-tank type nitrogen removing system in the fourth embodiment of the present invention, in which pH in the waste water can be adjusted to 4–6.5. That is, a third reaction tank 132 receiving therein with a filling material member 130, to which the denitrifying bacteria are attached and held, having the anaerobic condition is provided at a latter stage of the first reaction tank 124 and the second reaction tank 126, which are described in the above-described two-tank type nitrogen removing system, and a fourth reaction tank 136 receiving therein with a filling material member 134 having attached and held therein with the subordinate nutritional bacteria and having the aerobic condition is provided at a latter stage of the third reaction tank 132.

An underwater agitator 138 is provided at the bottom portion of the third reaction tank 130 and a nutritional source (hydrogen donor) of the denitrifying bacteria, for example, methanol is added from a nutritive source supplying device 140. Furthermore, the aeration device 116 is provided at the bottom portion of the fourth reaction tank 136.

In the four-tank type nitrogen removing system in the fourth embodiment of the present invention, nitrogen in nitrous acid form and nitrogen in nitric acid form, which remain in the liquid discharged from the second reaction tank 126, can be reduced into nitrogen gas, and, in the fourth reaction tank 136, surplus methanol added to the third reaction tank 132 and a BOD content in the waste water, can be removed.

Furthermore, ammonium nitrogen in the waste water is converted into nitrogen gas from hydroxylamine in the second reaction tank 126, whereby nitrogen in nitrous acid form and nitrogen in nitric acid form, which are processed in the third reaction tank 132, are decreased, so that the usage of methanol can be decreased.

Next, description will be given of the fifth embodiment of the present invention. In the fifth embodiment, a nitrogen oxide compound is autilized as an electron donor, whereby the oxidizing type nitrogen is chemically denitrified without needing the organic matter.

Figure 12:
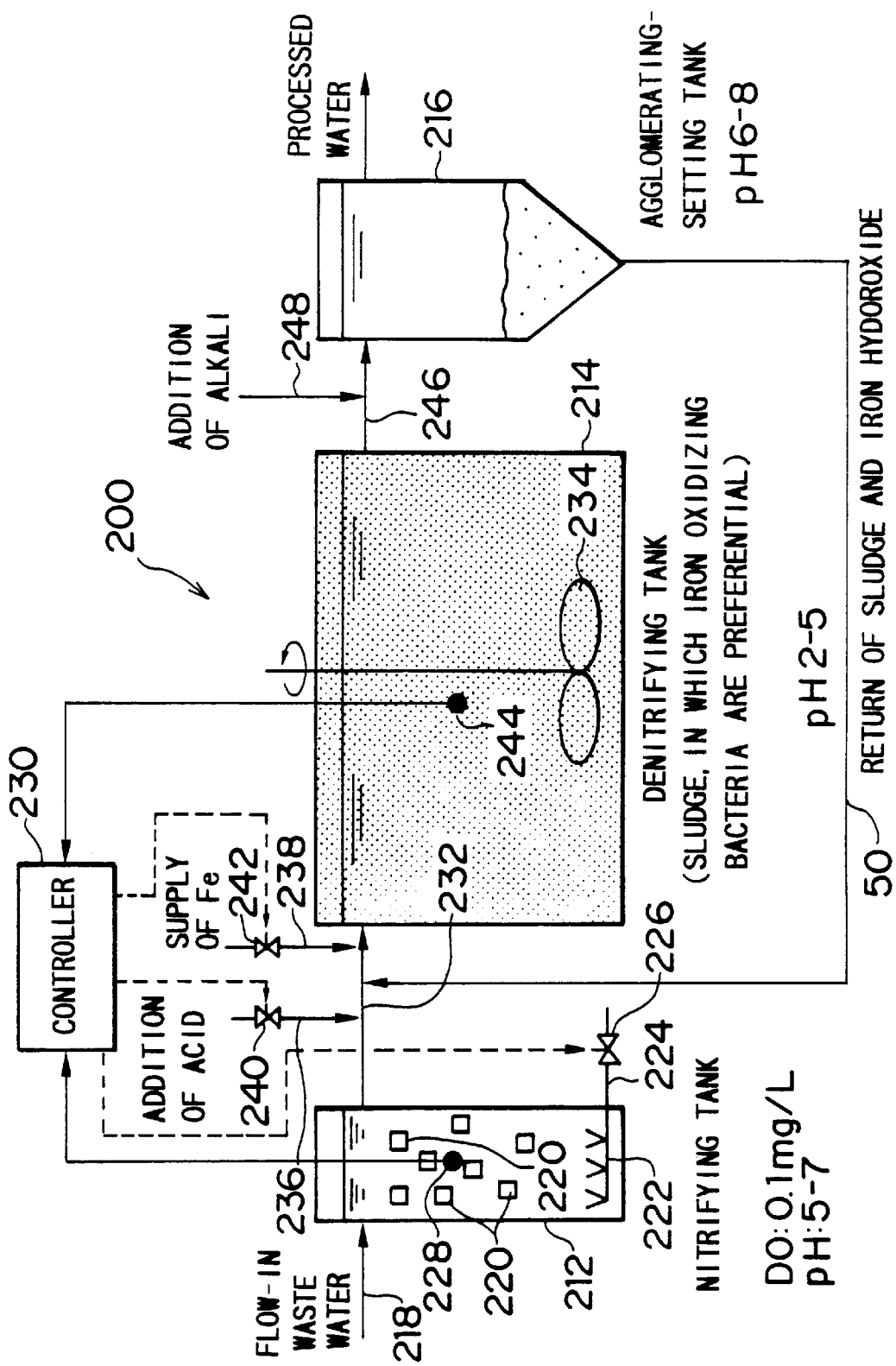
FIG. 12 is a block diagram explaining the fifth embodiment of the nitrogen removing system according to the present invention.

As shown in FIG. 12, a nitrogen removing system 200 includes a first reaction tank (nitrifying tank) 212, a second reaction tank (denitrifying tank) 214 and an agglomerating-settling tank 216.

A multiplicity of immobilized microorganisms 220, in which the nitrifying bacteria are entrapped in the gels are thrown into the nitrifying tank 212, into which the waste water containing ammonium nitrogen flows through an original water supply pipe 218, and an aeration device 222 is provided at the bottom portion of the nitrifying tank 212. The aeration device 222 is connected to a blower, not shown, through an air piping 224, and an adjusting valve 226 for adjusting a value of aeration air is provided on the air piping 224. A DO (dissolved oxygen) sensor 228 is provided in the nitrifying tank 212 and the concentration of dissolved oxygen in the nitrifying tank 212, which has been detected by the DO sensor 228, is output into a controller 230. The controller 230 adjusts the opening degree of the adjusting valve 226 on the basis of a detected value of the DO sensor 228, whereby the controller 230 controls such that the level of dissolved oxygen (hereinafter referred to as "DO") becomes 0.1 mg/L or more.

Nitrifying liquid containing the oxidizing type nitrogen, which is produced such that ammonia are oxidized through the nitrifying process in the nitrifying tank 212, passes through a first water supply pipe 232 and is supplied to the denitrifying tank 214.

The activated sludge containing the iron oxidizing bacteria and ferrous chloride existing as iron ions in the water of ferric chloride and the like are thrown into the denitrifying tank 214, and an agitator 234 is provided in the denitrifying tank 214 such that the rate of contact among the nitrifying liquid, the iron oxidizing bacteria and iron ions can be improved.

An acid adding pipe 236 for adding acid such as aqueous solution of hydrochloric acid or aqueous solution of sulfuric acid and an iron supply piping 238 for supplying ferric chloride are provided in the midway of the first water supply pipe 232, and, adjusting valves 240 and 242 are provided on the acid adding pipe 236 and the iron supply piping 238, respectively. Furthermore, a pH measuring sensor 244 is provided in the denitrifying tank 214 and a detected value detected by the pH measuring sensor 244 is output into the controller 230. In the controller 230, the adjusting valve 240 of the acid adding pipe 236 is controlled on the basis of the detected value from the pH measuring sensor 244 such that pH in the denitrifying tank 214 becomes 2–5. Furthermore, the adjusting valve 242 of the iron supply piping 238 is controlled such that ferric chloride having a value commensurate to a flow-out value of iron ions flowing out of the denitrifying tank 214 can be supplied from the iron supply piping 238.

Denitrified liquid denitrified in the denitrifying tank 214 is supplied to the agglomerating-settling tank 216 through a second water supply pipe 246, and an alkali adding piping 248 is provided on the second water supply pipe 246, and pH of the treated water is adjusted from pH 2–5 in the denitrifying tank 214 to pH 6–8. By this addition of alkali to the denitrified liquid, iron ions in the denitrified liquid are converted into hydroxide and settled to the bottom portion of the agglomerating-settling tank 216, and the denitrified liquid to be discharged from the system is neutralized. Furthermore, a return piping 250 is provided from the bottom portion of the agglomerating-settling tank 216 to an inlet of the denitrifying tank 214, and the activated sludge containing the iron oxidizing bacteria, which is mixed in the denitrified liquid and has flowed out of the denitrifying tank 214, and hydroxide, which has settled in the agglomerating-settling tank 216, are circulated to the denitrifying tank 214. In this case, when the iron oxidizing bacteria, ferric chloride, magnetite and the like are generally fixed and thrown into the denitrifying tank 214, flow-out from the denitrifying tank 214 can be prevented, so that the agglomerating-settling tank 216 can be dispensed with. However, in this case, it is necessary that a pH adjusting tank is provided at a latter stage of the denitrifying tank 214, for neutralizing pH of the denitrified liquid. Supernatant liquid in the agglomerating-settling tank 216 is discharged from the system as the processed liquid.

Description will be given of the nitrogen removing method according to the present invention by use of the nitrogen removing system 200 in the fifth embodiment constructed as above.

Figure 13:
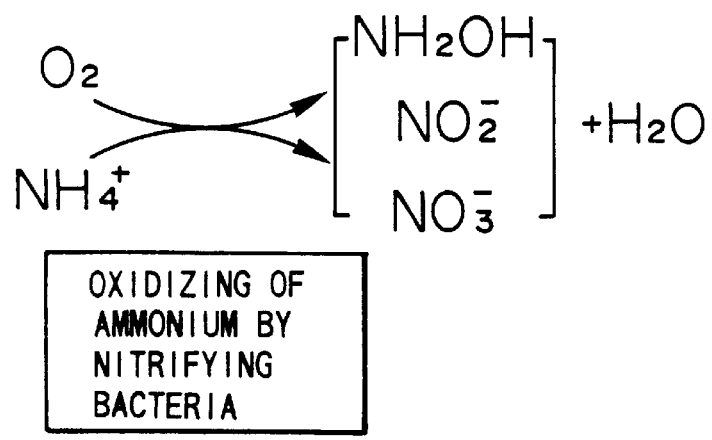
FIG. 13 is an explanatory view explaining the reaction of the nitrifying process.

The waste water containing ammonium nitrogen is supplied to the nitrifying tank 212 from the original water supply pipe 218. In the nitrifying tank 212, the aeration air valve from the aeration device 222 is controlled by the controller 230 on the basis of the detected value from the DO sensor 228, the DO level in the nitrifying tank 212 is controlled to 0.1 mg/L or more, and, in this state, the waste water is brought into contact with the immobilized microorganisms 220 and the nitrifying is performed. At this time, when pH is within the neutral range in the normal waste water, it is not necessary to adjust pH in the waste water, whereas, when pH is out of the range 5–7, it is necessary that acid or alkali is added from a pH adjusting device, not shown, and pH is adjusted to 5–7. In this nitrifying process, the DO level and the pH level are set at the above-described condition, whereby, as shown in FIG. 13, as the oxidizing type nitrogen, in which ammonium nitrogen is oxidized, the nitrifying liquid, in which hydroxylamine is mixed with at least one of the nitrogen in nitric acid form and nitrogen in nitrous acid form, is produced.

Figure 14:
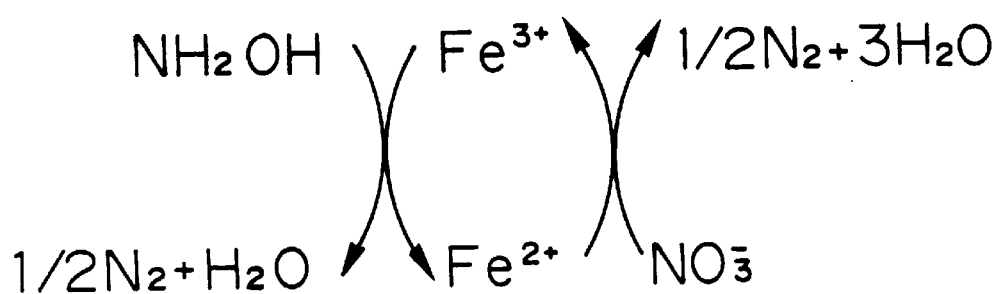
FIG. 14 is an explanatory view explaining the reaction of the denitrifying process.

Next, the nitrifying liquid passes through the water supply pipe 232 and is supplied to the denitrifying tank 214, and the nitrifying liquid, which has flowed into the denitrifying tank 214 is brought into contact with iron ions and the iron oxidizing bacteria, whereby chemical denitrifying reaction shown by the following reaction formulas and shown in FIG. 14, is performed.

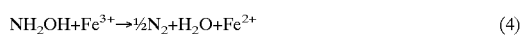

$$NH_2OH+Fe^{3+} \rightarrow \tfrac{1}{2}N_2+H_2O+Fe^{2+} \quad (4)$$

$$NO_3^-+Fe^{2+}+(\text{iron oxidizing bacteria}) \rightarrow \tfrac{1}{2}N_2+3H_2O+Fe^{3+} \quad (5)$$

By reaction of hydroxylamine in the nitrifying liquid with $Fe^{3+}$, hydroxylamine is chemically oxidized and decomposed into nitrogen and water, while $Fe^{3+}$ is reduced to $Fe^{2+}$.

Furthermore, by reaction of nitrogen in nitric acid form in the nitrifying liquid with $Fe^{2+}$ in the presence of the iron oxidizing bacteria, $Fe^{2+}$ is oxidized into $Fe^{3+}$, while nitric acid type nitrogen is reduced by receiving electrons emitted from $Fe^{2+}$ as the electron donor and decomposed into nitrogen gas and water. Incidentally, this is true of nitrogen in nitrous acid form.

Accordingly, the above-described reactions (4) and (5) are performed in the denitrifying tank 214, so that, in both reactions, the nitrogen oxide compound can be converted into nitrogen gas without the presence of the organic matter as being the electron donor. Furthermore, iron ions reduced through the course of $Fe^{3+} \rightarrow Fe^{2+}$ by the reaction (4) is oxidized through the course of $Fe^{2+} \rightarrow Fe^{3+}$ in the presence of the iron oxidizing bacteria, whereby, in the denitrifying tank 214, iron ions are present as $Fe^{2+}$ or $Fe^{3+}$. In this case, in the denitrifying tank 214, pH is controlled to 2–5. With this arrangement, iron ions can be present in the denitrifying tank 214 as iron ions having high reactivity without being settled as salt.

Incidentally, when acidophilic nitrifying bacteria are entrapped in the gels together with the iron oxidizing bacteria, ferric chloride, magnetite and the like are thrown into the nitrifying tank, the denitrifying tank, agglomerating-settling tank and iron supply piping can be dispensed with.

EXAMPLES

Next, description will be given of examples of the nitrogen removing method according to the present invention by use of the nitrogen removing system shown in FIG. 5.

Example 1

Example 1 is a case where the immobilized microorganisms are used, in which the nitrifying bacteria as the oxidizing bacteria, magnetite as the catalytically acting substance and the activated sludge containing the iron oxidizing bacteria as the converting bacteria are entrapped in the gels together.

The construction of the immobilized microorganisms, the number of bacteria in the immobilized microorganisms, the concentration and the shape of the immobilized microorganisms are shown in TABLE 1.

TABLE 1

| | |
|---|---|
| macromolecular gel material (polyethylene glycol) | 15% |
| activated sludge containing iron oxidizing bacteria | 2% |
| magnetite | two levels including 5 or 10% |
| water | about 75% |
| number of nitrifying bacteria in media | $10^6$ cell/mL-media |
| number of iron oxidizing bacteria in media | $10^3$ cell/mL-media |
| shape of media | 3 mm square shape |

Furthermore, the operating condition is shown as follows in TABLE 2.

TABLE 2

| | |
|---|---|
| concentration of ammonium ($NH_4$—N) in synthetic waste water | 20 mg/L |
| load | 0.16 kg-N/m$^3$ · day |
| dwell time | 3 h |

TABLE 2-continued

| | |
|---|---|
| volume of waste water in treating tank | 5 L |
| filling rate of media | 10% |
| temperature of water | 20° C. |
| aeration value | 8 L/min |
| number of days of continuous operation | 150 days |
| pH in treating tank | 7 |

Figure 15:
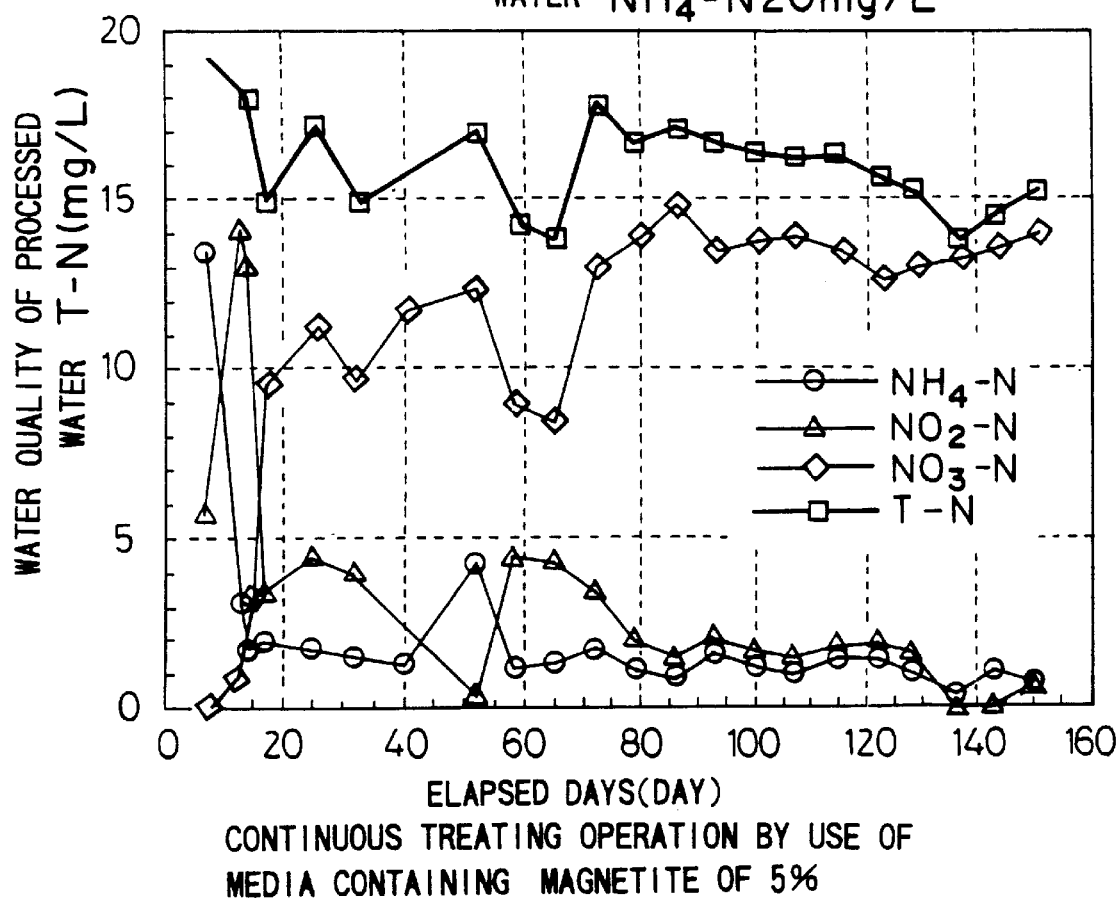
FIG. 15 is an explanatory view in a case of magnetite being 5% in the embodiment of the present invention.
Figure 16:
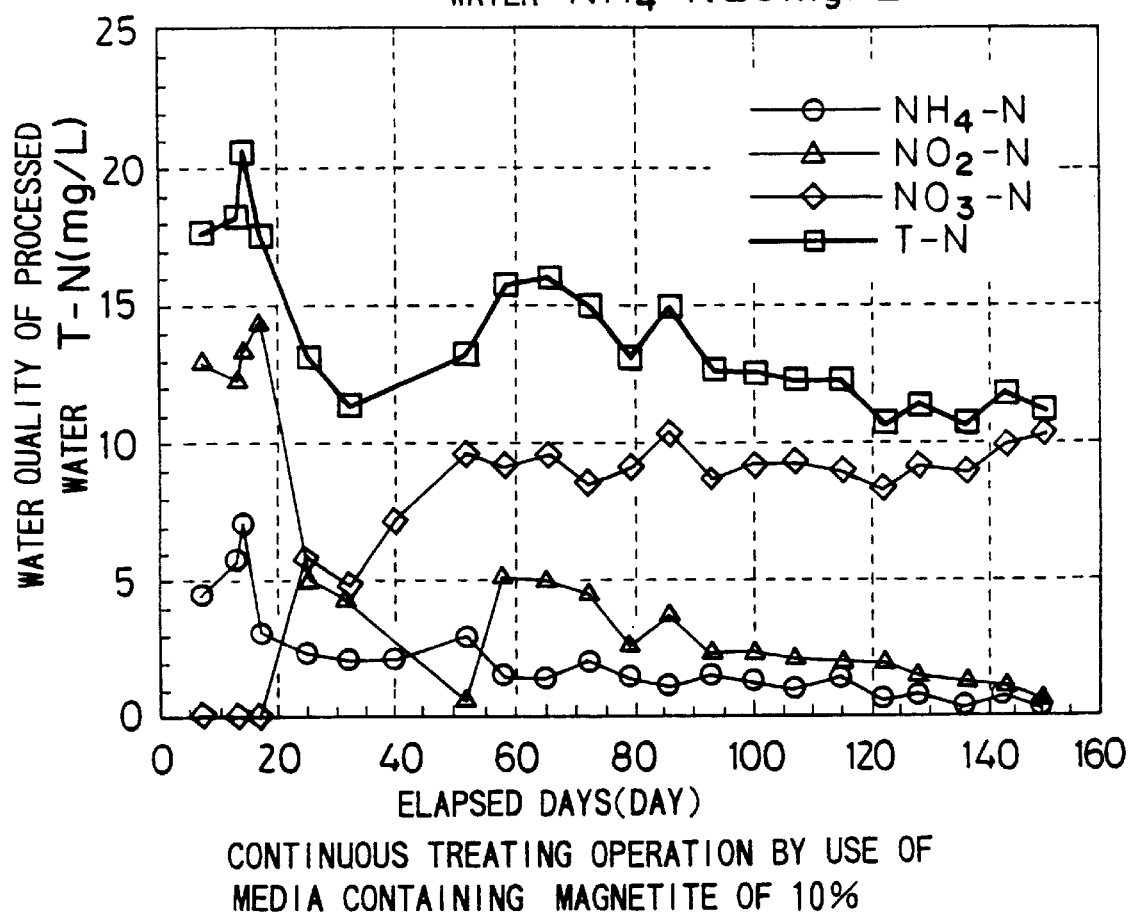
FIG. 16 is an explanatory view showing the result of the experiment in a case of magnetite being 10% in the embodiment of the present invention.

FIGS. 15 and 16 show the water qualities of the water processed under the condition shown in the example 1. FIG. 15 shows the case of magnetite being 5% and FIG. 16 shows the case of magnetite being 10%.

In FIGS. 15 and 16, the total nitrogen concentration (T-N) is calculated from the sum total of the ammonium nitrogen concentration ($NH_4$—N), the concentration of nitrogen in nitrous acid form ($NO_2$—N) and the concentration of nitrogen in nitric acid form ($NO_3$—N).

That is, a difference obtained by the subtraction of the total nitrogen concentration (T-N), which is the sum total of the ammonium nitrogen concentration ($NH_4$—N) of the treated water, the concentration of nitrogen in nitrous acid form ($NO_2$—N) and the concentration of nitrogen in nitric acid form ($NO_3$—N), from the ammonia concentration ($NH_4$—N) of 20 mg/L of the waste water as being the original water can be regarded as a denitrified value denitrified by the short-cut type denitrifying reaction:

(denitrified value by short-cut type denitrifying reaction)= ($NH_4$—N concentration of original water)−(T-N concentration of processed water).

As apparent from FIGS. 15 and 16, although dispersions were recognized with the elapse of days after the start of the operation, in the case of magnetite being 5%, the denitrified value by the short-cut type denitrifying reaction underwent not much change from about 5 mg/L. This fact means that about 25% of 20 mg/L of the ammonium concentration of the original water was denitrified by the short-cut type denitrifying reaction.

Furthermore, in the case of magnetite being 10%, the denitrified value underwent not much change from about 5 mg/L. This fact means that about 25–50% of 20 mg/L of the ammonia concentration of the original water was denitrified by the short-cut type denitrifying reaction.

Normally, in the process of the drainage and the like, as for T-N removal rate, it is required to achieve the process performance of about T-N 10 mg/L of the processed water, i.e., 50%, and it is thought that the result of the nitrogen removing method of the short-cut type denitrifying reaction is satisfactory. Further, in the case of the present invention, it was recognized that, when the reaction time is lengthened, T-N removal rate 75% was obtained at the highest.

Incidentally, there was no problem about the ammonia concentration of the processed water, because the ammonia concentration was able to be lowered to about 2 mg/L or less. Furthermore, as apparent from the drawing, up to about thirty days after the start of the operation, the fixed activated sludge was decomposed by itself, whereby the total nitrogen concentration was increased.

Example 2

Example 2 shows a case where fly ash was used as the catalytically acting substance and the activated sludge was used as the converting bacteria, and the immobilized microorganisms, in which fly ash and the activated sludge were entrapped in the gels were used.

The construction of the immobilized microorganisms and the number of bacteria in the immobilized microorganisms are shown as follows in TABLE 3.

TABLE 3

| | |
|---|---|
| macromolecular gel material (polyethylene glycol) | 15% |
| activated sludge containing iron oxidizing bacteria | 2% |
| fly ash | two levels including 10 or 20% |
| water | about 75% |
| number of nitrifying bacteria in media | $10^6$ cell/mL-media |
| shape of media | 3 mm square shape |

Furthermore, the operating condition was the same as in the example 1.

Figure 17:
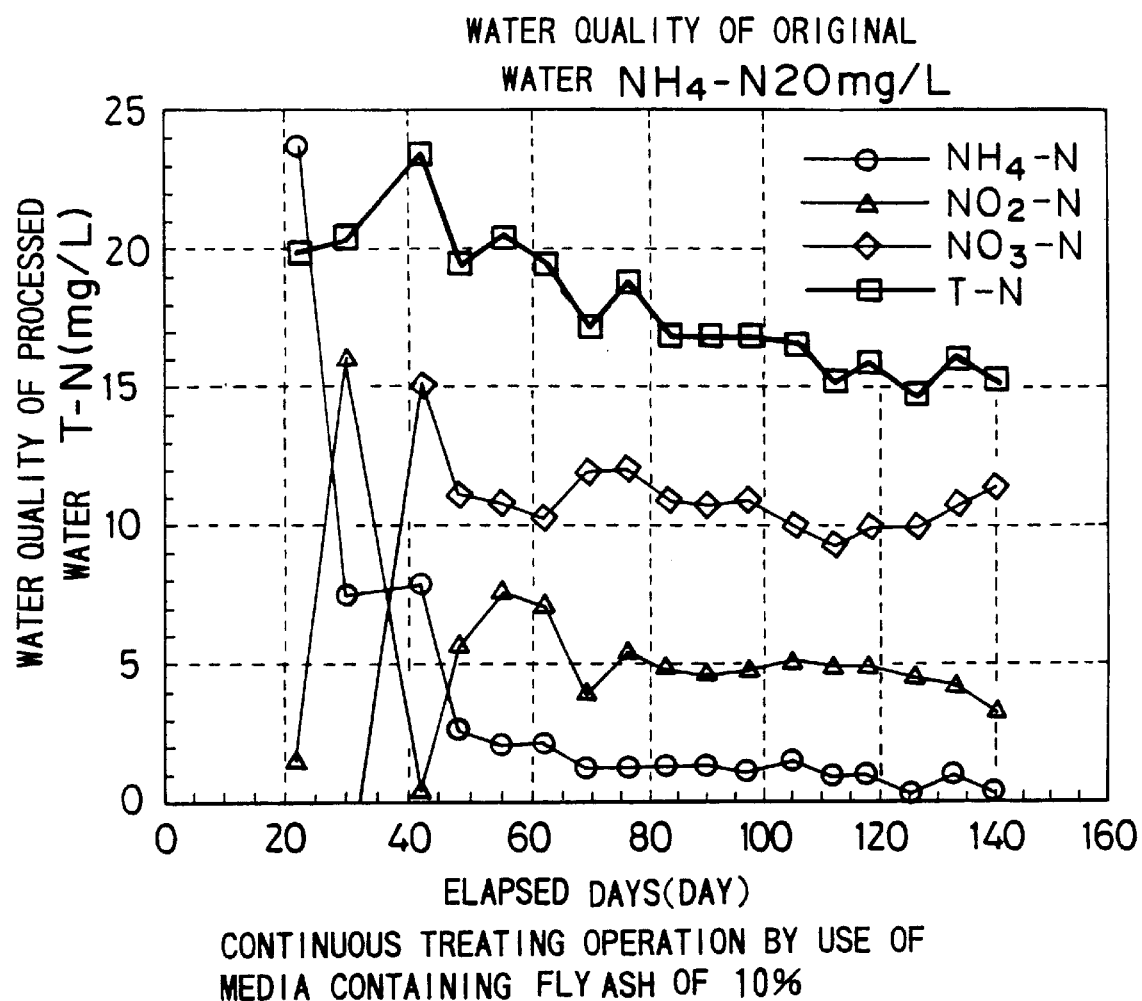
FIG. 17 is an explanatory view showing the result of the experiment in a case of fly ash being 10% in the embodiment of the present invention.
Figure 18:
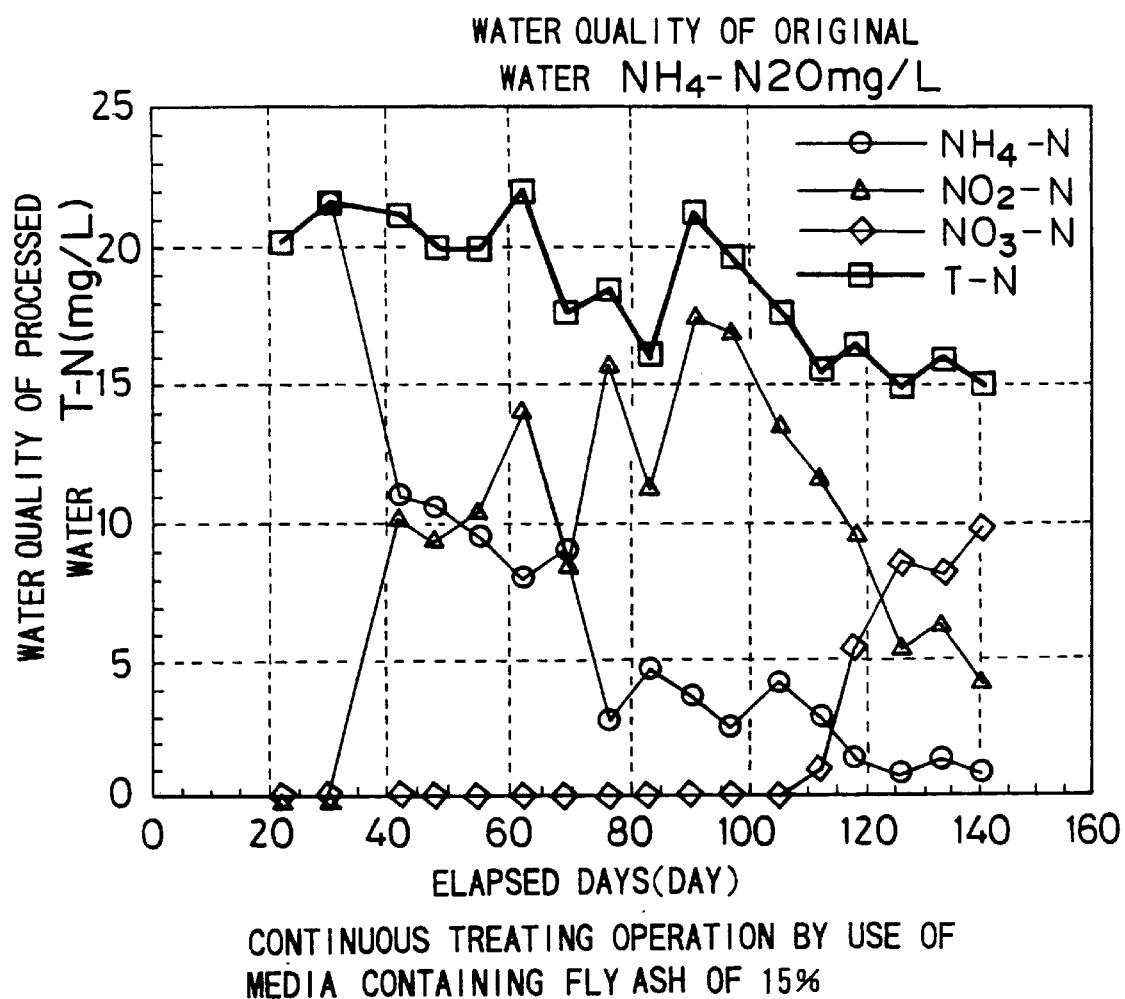
FIG. 18 is an explanatory view showing the result of the experiment in a case of fly ash being 15% in the embodiment of the present invention.

The results of the example 2 are shown in FIGS. 17 and 18.

As apparent from FIGS. 17 and 18, in the case of fly ash being 10% and 15%, although the denitrified value in the short-cut type denitrifying reaction was slightly small as compared with the case of magnetite, during the latter half of 150 days of the operation, the denitrified value underwent not much change from about 5 mg/L.

Control Example

In a Control Example, there was used the so-called conventional immobilized microorganisms, in which the activated sludge heightened in the nitrifying bacteria concentration was entrapped the macromolecular gels as the oxidizing bacteria.

The construction of the immobilized microorganisms, the number of the nitrifying bacteria in the immobilized microorganisms, the concentration and the immobilized microorganisms shape of the conventional immobilized microorganisms are shown in TABLE 4.

TABLE 4

| | |
|---|---|
| macromolecular gel material (polyethylene glycol) | 15% |
| activated sludge containing iron oxidizing bacteria | 2% |
| number of nitrifying bacteria in media | $10^6$ cell/mL-media |
| number of iron oxidizing bacteria in media | $10^3$ cell/mL-media |
| water | about 83% |
| shape of media | 3 mm square shape |

Figure 19:
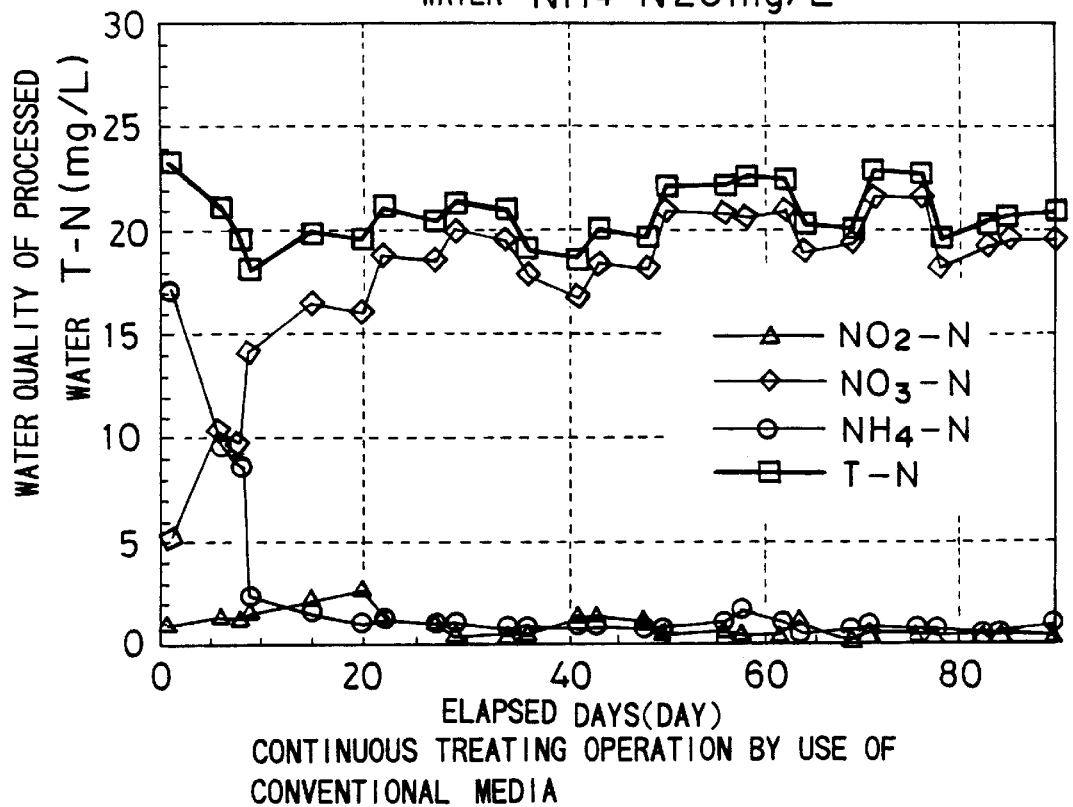
FIG. 19 is an explanatory view showing a control example, which shows the result of the experiment in a case of the conventional immobilized microorganisms.

Furthermore, the operating condition was identical with the case of the examples 1 and 2, and the result of the Control Example was shown in FIG. 19.

As apparent from FIG. 19, there was no difference showing the denitrified value in the short-cut type denitrifying reaction between $NH_4$—N concentration of the original water and T-N concentration of the processed water, and T-N concentration of the processed water underwent not much change from 20 mg/L similar to $NH_4$—N concentration of the original water. Furthermore, the content of T-N concentration of the processed water was nitrogen in nitric acid form ($NO_3$—N) at about all. By this fact, it was recognized that the conventional nitric acid type denitrifying reaction proceeded, but the short-cut type denitrifying reaction by use of the immobilized microorganisms according to the present invention did not proceed at all.

From the results of Example 1, 2, and the Control Example, by performing the nitrogen removing method by use of the immobilized microorganisms according to the present invention, it was substantiated that the short-cut type denitrifying reaction proceeded.

Example 3

In Example 3, regarding magnetite and fly ash which were used in the Examples 1 and 2, the proper content in the immobilized microorganisms was examined.

Figure 20:
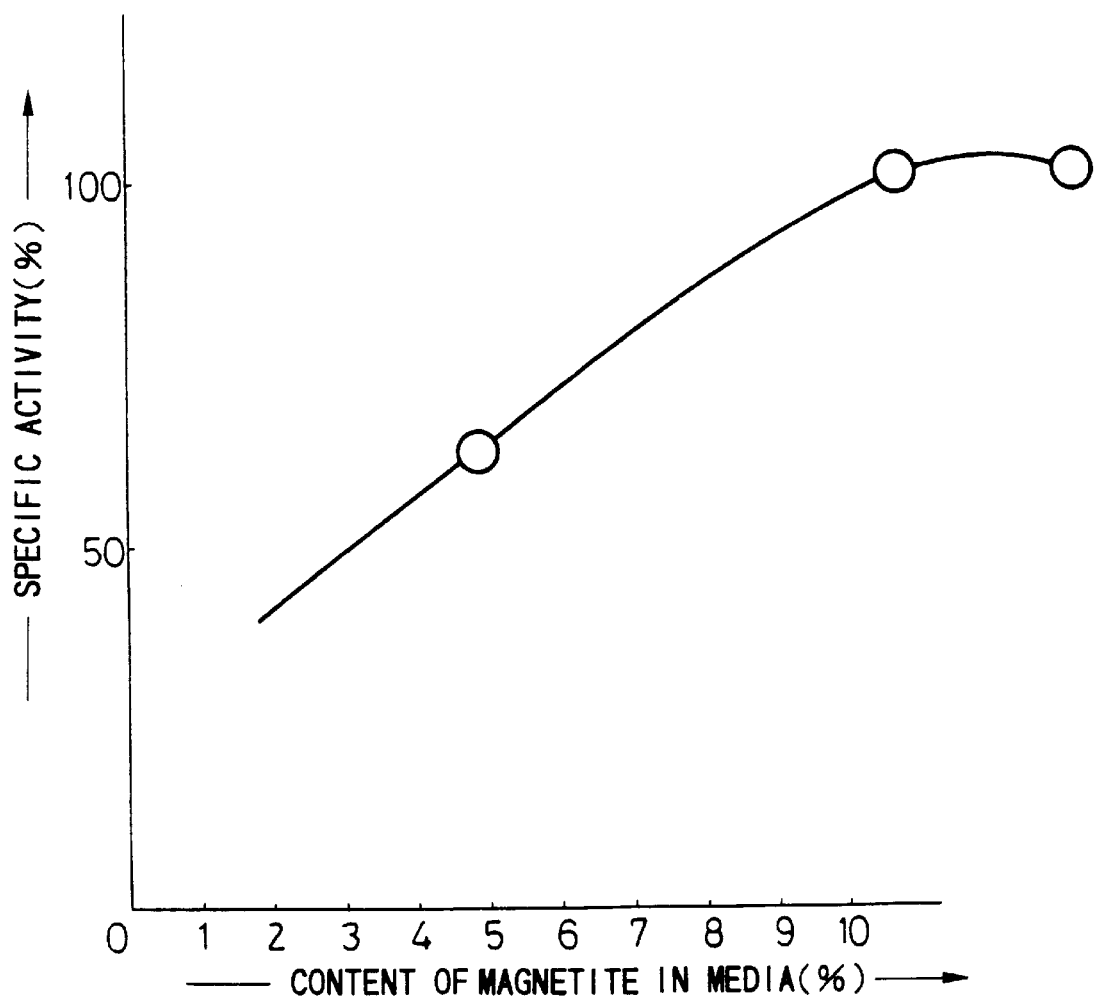
FIG. 20 is an explanatory view explaining the proper content of magnetite.

FIG. 20 is the diagram showing the relationship between the magnetite content (%) and the specific activity (%), wherein:

specific activity (%) =

$$\frac{\text{nitrogen removing rate of media (mg} - N/h \cdot L - \text{media)}}{\text{the highest removing rate of media (mg} - N/h \cdot L - \text{media)}} \times 100$$

Figure 21:
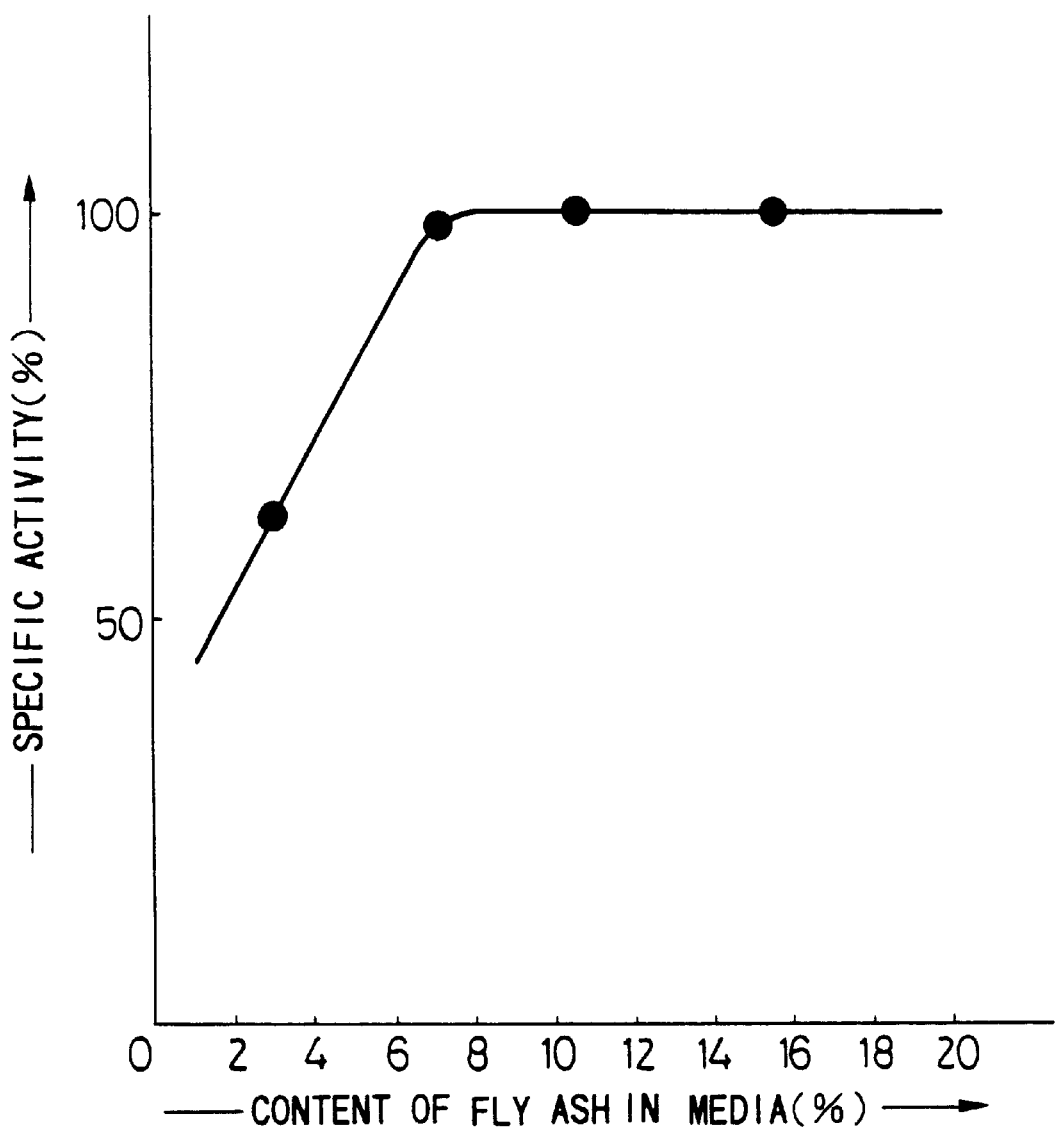
FIG. 21 is an explanatory view explaining the proper content of fly ash.

FIG. 21 is the diagram showing the relationship between the content (%) of fly ash in the immobilized microorganisms and the specific activity (%).

From FIG. 20, it is apparent that the content (%) of magnetite in the immobilized microorganisms is 1% or more and preferably 3% or more.

Furthermore, from FIG. 21, it is apparent that the content (%) of fly ash is 2% or more and preferably 6% or more.

By the way, as for the magnetite used in this embodiment, ferric chloride was 96% or more, water was 0.8% or less, sulfuric acid radical was 0.8% or less, pH was 9–10, the bulk specific gravity was 0.3 g/mL and the true specific gravity was 5 g/mL. Furthermore, as for fly ash, silicon dioxide was 50%, moisture was less than 1% and the specific gravity was 2.28.

Example 4

Example 4 was performed by use of the nitrogen removing system including the first reaction tank and the second reaction tank as shown in FIG. 10. As Control Example 4, the conventional media, in which the iron oxidizing bacteria were not present, were thrown into an aeration tank, and the process in the aerobic condition was performed.

TABLE 5 shows the construction of the immobilized microorganisms thrown into the first reaction tank and the second reaction tank as shown in Example 4 and the construction of the immobilized microorganisms thrown into the aeration tank in Control Example 4.

TABLE 5

|  | Example 4 | | Control |
|---|---|---|---|
|  | first reaction tank | second reaction tank | Example 4 aeration tank |
| fixing material (polyethylene glycol) | 15 | 15 | 15 |
| number of nitrifying bacteria (cell/mL-media) | $10^6$ | $10^6$ | $10^6$ |
| activated sludge containing iron oxidizing bacteria (%) |  | 2 |  |
| number of iron oxidizing bacteria (cell/mL-media) |  | $10^4$ |  |
| activated sludge containing denitrifying bacteria (%) |  |  | 2 |
| water (%) | about 85 | about 83 | about 83 |

TABLE 6 shows the ammonium concentration of the original water and the operating conditions, which were submitted to the experiments. Example 4 shows the operating condition for the nitrogen removing system consisting of the first and second reaction tanks, and Control Example 4 shows the operating condition for the aeration tank. Incidentally, inorganic synthetic waste water was used as the original water submitted to the experiment.

TABLE 6

|  | Example 4 | Control Example 4 |
|---|---|---|
| $NH_4$—N concentration of original water (mg(L) | 200 | 200 |
| load (kg/m$^3$ · day) | 0.20 | 0.20 |
| dwell time (hour) | 24 | 24 |
| volume of reaction tank or aeration tank (L) | 5 | 5 |
| filling rate of media (%) | 10 | 10 |
| water temperature (° C.) | 20 | 20 |
| addition of organic matter | no | no |
| aeration value (L/min) | 8 | 8 |

(Remarks: The volume of the reaction tank in Example 4 is the sum total of the first and second reaction tanks.)

As a result, as for the water quality of the processed water in Control Example 4, $NH_4$—N concentration was 5 mg/L or less, $NH_2OH$ concentration was 1 mg/L or less, $NO_2$—N concentration was 10 mg/L and $NO_3$—N concentration was 195–200 mg/L. As apparent from this result, since the immobilized microorganisms had no iron oxidizing bacteria, the aerobic denitrifying reaction did not proceed at all. Accordingly, the total nitrogen concentration of the waste water was not able to be decreased.

In contrast thereto, as for the water quality of the processed water in Example 4, $NH_4$—N concentration was 5 mg/L or less, $NH_2OH$ concentration was 1 mg/L or less, $NO_2$—N concentration was 1 mg/L or less and $NO_3$—N concentration was 82–123 mg/L, and the total nitrogen concentration (the sum total of $NH_4$—N concentration, $NO_3$—N concentration, $NH_2OH$ concentration and $NO_3$—N concentration) 82–132 mg/L. Here, a difference between $NH_4$—N concentration of the original water and the total nitrogen concentration of the processed water means the denitrified value denitrified through the reaction course of $NH_4 \rightarrow NH_2OH \rightarrow N_2$, i.e., the short-cut type denitrifying method according to the present invention. Accordingly, the ammonia concentration 68–118 mg/L obtained by subtracting the total nitrogen concentration 82–132 mg/L of the processed water from $NH_4$—N concentration 200 mg/L of the original water is the value denitrified by the short-cut type nitrogen removing method according to the present invention. Accordingly, about one half of the ammonium nitrogen in the original water was able to be removed by the processing method according to the present invention. From this fact, it is substantiated that the nitrogen removal in the aerobic condition can be performed by the nitrifying bacteria and the iron oxidizing bacteria.

Example 5

After completion of Example 4 and Control Example 4, Example 5 and Control Example 5 are performed for the original water (synthetic waste water) having a further higher ammonia concentration. The construction of the system and the fixed immobilized microorganisms in Example 5 and the construction of the system and the immobilized microorganisms used in Control Example 5 are identical with those shown in Example 4 and Control Example 4 and the description will be omitted.

Table 7 shows the ammonia concentration of the inorganic synthetic waste water submitted to the experiment and the operating condition.

TABLE 7

|  | Example 5 | Control Example 5 |
|---|---|---|
| $NH_4$—N concentration of original water (mg/L) | 1000 | 1000 |
| load (kg/m$^3$ · day) | 0.50 | 0.50 |
| dwell time (hour) | 48 | 48 |
| volume of reaction tank or aeration tank (L) | 5 | 5 |
| filling rate of media (%) | 10 | 10 |
| water temperature (° C.) | 20 | 20 |
| addition of methanol | no | no |
| aeration value (L/min) | 8 | 8 |

As a result, as for the water quality of the treated water in Control Example 5, $NH_4$—N concentration was 10 mg/L or less, $NH_2OH$ concentration was 1 mg/L or less, $NO_2$—N concentration was 570–650 mg/L and $NO_3$—N concentration was 340–420 mg/L. As apparent from this result, since the immobilized microorganisms had no iron oxidizing bacteria, the denitrifying reaction in the aerobic condition did not proceed at all similarly to Control Example 4.

In contrast thereto, as for the water quality of the processed water in Example 5, $NH_4$—N concentration as 10 mg/L or less, $NH_2OH$ concentration was 1 mg/L or less, $NO_2$—N concentration was 340–410 mg/L or less and $NO_3$—N concentration was 84–145 mg/L. Accordingly, 565–432 mg/L obtained by subtracting the total nitrogen concentration 435–568 mg/L of the treated water from $NH_4$—N concentration 1000 mg/L of the original water is the value denitrified by the processing method according to the present invention. As described above, in the case where ammonium nitrogen was high in concentration, about one half of it was able to be removed by the processing method according to the present invention.

Example 6

Example 6 was performed by the nitrogen removing system described in FIG. 11, and the immobilized microorganisms used in Example 5 were continuously used in the first and second reaction tanks.

TABLE 8 shows the ammonia concentration of the inorganic synthetic waste water and the operating condition which were submitted to the experiment.

TABLE 8

|  | Example 6 |
|---|---|
| $NH_4$—N concentration of original water (mg/L) | 1000 |
| load (kg/m$^3$ · day) | 0.40 |
| dwell time (hour) | 60 |
| volume of reaction tank or aeration tank (L) | 5 |
| filling rate of media (%) | 10 |
| water temperature (° C.) | 20 |
| addition of methanol | 1st, 2nd & 4th reaction tank: no<br>3rd reaction tank: yes |
| aeration value (L/min) | 1st & 2nd reaction tank: 8<br>3rd reaction tank: no<br>4th reaction tank: 8 |

As a result, as for the water quality of the treated water in Example 6, $NH_4$—N concentration was 10 mg/L or less, $NH_2OH$ concentration was 1 mg/L or less, $NO_2$—N concentration was 5 mg/L or less and $NO_3$—N concentration was 10 mg/L or less, and the satisfactory water quality was obtained. Addition of methanol at this time was 1032–1360 (mg/L). Incidentally, when the usage of methanol was investigated by the activated sludge circulation modified method which was the typical example of the conventional nitrifying-denitrifying process by use of the same original water as one used in Example 6 as a Control Example, the value of methanol needed for denitrifying the nitrifying liquid having $NO_3$—N concentration of 960 mg/L was 2300 mg/L. From this result, it is known that, by use of the nitrogen removing method according to the present invention, the value of methanol to be used for denitrifying process can be decreased to about one half.

Example 7

Description will hereunder be given of Example 7, in which the nitrogen removing method according to the present invention by use of the nitrogen removing system shown in FIG. 12, was performed. The operating condition is shown as follows in TABLE 9.

TABLE 9

| dwell time in nitrifying tank (hour) | 3 |
|---|---|
| dwell time in denitrifying tank (hour) | 5 |
| DO level in nitrifying tank (mg/L) | 0.2–0.7 |
| pH in denitrifying tank | 3–5 |
| pH in agglomerating-settling tank | 6.5–7.5 |
| sludge return rate with respect to the original water (%) | 25 |

As for the original water of the waste water, which flowed into the nitrifying tank, the nitrifying liquid at the outlet of the nitrifying tank and the processed water at the outlet of the agglomerating-settling tank at the time when the operation was performed under the above-described operating condition, there were measured the nitrogen in ammonia form ($NH_2$—N) concentration, nitrogen in nitrous acid form ($NO_2$—N) concentration, nitrogen in nitric acid form ($NO_3$—N) concentration and hydroxylamine ($NH_2OH$) concentration, respectively. As the original water of the waste water, the inorganic synthetic waste water containing no organic matter was used. The results of measurement are shown in TABLE 10.

TABLE 10

| sample | concentration (mg/L) | | | |
|---|---|---|---|---|
|  | $NH_4$—N | $NO_2$—N | $NO_3$—N | $NH_2OH$ |
| original waste water | 55–300 | 0.2 or less | 0.2 or less | 0.2 or less |
| nitrifying liquid | 2–20 | 4–52 | 44–288 | 13–39 |
| processed water | 1–17 | 0.2–3 or less | 7–21 | 0.2 or less |

As apparent from TABLE 10, the nitrifying liquid including the oxidizing type nitrogen, in which hydroxylamine, nitrogen in nitric acid form and nitrogen in nitrous acid form are mixed together, was produced, in the nitrifying tank and, by processing the nitrifying liquid in the denitrifying tank, the concentration of the nitrogen content of the processed water was able to be decreased satisfactorily.

From this result, it was substantiated that, by performing the nitrogen removing method according to the present invention, nitrifying and denitrifying were able to be performed without requiring the organic matter as the hydrogen donor.

Accordingly, the nitrogen removing method according to the present invention is most suitable for the inorganic waste water including high concentration ammonia and having no organic matter, such as exudate from refuse disposal grounds, the waste water from thermal power stations and scrubber waste water of the sludge disposal systems.

As has been described above, by the nitrogen removing method and system and the immobilized microorganisms according to the present invention, nitrogen can be removed through the reaction course of $NH_4 \rightarrow NH_2OH \rightarrow N_2$, so that the processing time can be shortened and the processing cost can be reduced greatly because methanol and the like as the nutritive source for bacteria are not used, or the use of methanol and the like can be minimized.

Further, both the nitrifying and the denitrifying can be performed in the aerobic condition, whereby one reaction tank can be utilized, so that the system can be made compact.

Furthermore, according to the nitrogen removing method of the present invention, the nitrifying liquid containing the nitrogen oxide compound, in which hydroxylamine and at least one of nitrogen in nitric acid form and nitrogen in nitrous acid form are mixed together, is produced in the first reaction tank and the nitrifying liquid is brought into contact with iron ions and the iron oxidizing bacteria, so that the denitrifying process can be performed without requiring the organic matter as the hydrogen donor.

Accordingly, the organic matter such as methanol or the like, which has been added during the denitrifying process in the past, is not necessary, so that the processing cost can be reduced. Furthermore, since no organic matter is required in the reaction, the method is very useful for the inorganic waste water having no organic matter such as the exudate from the refuse disposal grounds, the waste water from the thermal power stations and the scrubber waste water and the like of the sludge disposal system.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A nitrogen removing method of biologically processing a nitrogen compound in waste water and removing nitrogen, wherein oxidizing bacteria for oxidizing said nitrogen compound, a catalytically acting substance for converting an oxidizing intermediate product of said nitrogen compound, which is produced by being oxidized by said oxidizing bacteria into nitrogen, and converting bacteria for regenerating nitrogen converting capacity of said catalytically acting substance are brought into contact with said waste water in the aerobic condition to thereby oxidize said nitrogen compound into oxidizing intermediate product by said oxdizing bacteria, convert said oxidizing intermediate product into nitrogen by said catalytically acting substance and regenerate a nitrogen converting power of said catalytically acting substance by said converting bacteria.

2. A nitrogen removing method as set forth in claim 1, wherein said oxidizing bacteria, said catalytically acting substance and said converting bacteria are entrapped in macromolecular gels separately from each other or together, or two out of those including said oxidizing bacteria, said catalytically acting substance and said converting bacteria are combined together.

3. A nitrogen removing method as set forth in claim 1, wherein said oxidizing bacteria, said catalytically acting substance and said converting bacterial are attached to attached media separately from each other or together, or two out of those including said oxidizing bacteria, said catalytically acting substance and said converting bacteria are combined together.

4. A nitrogen removing method as set forth in claim 1, wherein said oxidizing bacteria and said converting bacteria are naturally attached to media to be attached, to which said catalytically acting substance is forcedly attached.

5. A nitrogen removing method as set forth in claim 1, wherein a material containing said catalytically acting substance as one of contents is made to be attached media and said oxidizing bacteria and said converting bacteria are naturally attached to said attached media.

6. A nitrogen removing method as set forth in claim 1, wherein said oxidizing bacteria is a mixture, in which said oxidizing bacteria is mixed with one or two or more out of those including bacteria having a nitrogen compound oxidizing enzyme such as nitrifying bacteria, methane oxidizing bacteria, organic chlorine compound decomposing bacteria and white mold are mixed with each other.

7. A nitrogen removing method as set forth in claim 1, wherein said catalytically acting substance is a mixture, in which said catalytic acting substance is mixed with one or two or more out of those including a bivalent compound, a trivalent compound, magnetite, red hematite, limonite, magnetic iron ore, iron pyrite, activated carbon, fly ash sulfur compound, and a compound containing any one of copper, zinc and silicon.

8. A nitrogen removing method as set forth in claim 1, wherein said converting bacteria is a mixture, in which said converting bacteria is mixed with one or two or more out of those including said iron oxidizing bacteria, a sulfur oxidizing bacteria and activated sludge.

9. A nitrogen removing method as set forth in claim 1, wherein dissolved oxygen level in said waste water is controlled to 0.1 mg/L or more.

10. A nitrogen removing method as set forth in claim 1, wherein pH in said waste water is controlled to 4–6.5.

* * * * *